(12) United States Patent
Bandy

(10) Patent No.: US 11,952,049 B2
(45) Date of Patent: Apr. 9, 2024

(54) AUGMENTED RACK AND PINION STEERING SYSTEM

(71) Applicant: Ronald S. Bandy, South Lake Tahoe, CA (US)

(72) Inventor: Ronald S. Bandy, South Lake Tahoe, CA (US)

( * ) Notice: Subject to any disclaimer, the term of this patent is extended or adjusted under 35 U.S.C. 154(b) by 754 days.

(21) Appl. No.: 17/115,573

(22) Filed: Dec. 8, 2020

(65) Prior Publication Data

US 2022/0177024 A1 Jun. 9, 2022

(51) Int. Cl.
*B62D 3/12* (2006.01)
*B62D 1/04* (2006.01)
(Continued)

(52) U.S. Cl.
CPC ............... *B62D 3/12* (2013.01); *B62D 1/04* (2013.01); *B62D 1/16* (2013.01); *B62D 5/0403* (2013.01); *B62D 7/166* (2013.01); *B62D 7/18* (2013.01); *F16H 7/06* (2013.01); *F16H 57/0025* (2013.01); *F16H 57/035* (2013.01); *F16H 2057/02034* (2013.01)

(58) Field of Classification Search
CPC ... B62D 3/12; B62D 1/04; B62D 1/16; B62D 5/0403; B62D 7/166; B62D 7/18; F16H 7/06; F16H 57/0025; F16H 57/035; F16H 2057/02034
See application file for complete search history.

(56) References Cited

U.S. PATENT DOCUMENTS 4,488,615 A    12/1984   Millard
5,820,147 A * 10/1998   Rohweder ................ B62D 7/16
                                                     280/93.51
(Continued)

FOREIGN PATENT DOCUMENTS

CN            209212342 U   *   8/2019
WO    WO-2009062480 A2 *   5/2009           F16G 13/04

OTHER PUBLICATIONS

Isdtbower, Suspension Geometry-Getin it-Today; pirate4x4.com/ General4x4 Discussion, Oct. 31, 2015.
(Continued)

*Primary Examiner* — Jacob D Knutson
(74) *Attorney, Agent, or Firm* — Gary L. Eastman, Esq.; Eastman IP

(57) ABSTRACT

The present invention is a steering system for a beam-type solid axle arrangement. The steering system is designed to operate in conjunction with the triangulated link-style suspension system with zero bumpsteer during suspension travel and negligible bumpsteer during articulation. Accurate steering throughout suspension operations is satisfied with mechanical linkages that include a slow ratio rack and pinion gearset and unique augmented chain and sprocket assembly. The slow ratio of the rack and pinion gearset ensures negligible bumpsteer during articulation, thereby leading to negligible if any bumpsteer throughout operation of the suspension system. Meanwhile, augmentation of the chain and sprocket assembly defines a steering quickener (Continued)

effect thereby speeding up the rack and pinion gearset and restoring quick steering response. Effortless steering is ensured by appropriate use of electric or hydraulic assist devices.

19 Claims, 9 Drawing Sheets

(51) Int. Cl.

| | | |
|---|---|---|
| *B62D 1/16* | (2006.01) | |
| *B62D 5/04* | (2006.01) | |
| *B62D 7/16* | (2006.01) | |
| *B62D 7/18* | (2006.01) | |
| *F16H 7/06* | (2006.01) | |
| *F16H 57/00* | (2012.01) | |
| *F16H 57/035* | (2012.01) | |
| *F16H 57/02* | (2012.01) | |

(56) References Cited

U.S. PATENT DOCUMENTS

| | | | |
|---|---|---|---|
| 5,934,404 A | 8/1999 | DeLellis et al. | |
| 6,189,902 B1 | 2/2001 | Lenzen et al. | |
| 7,077,234 B2 | 7/2006 | Kiais et al. | |
| 7,401,677 B2 | 7/2008 | Boyle et al. | |
| 8,042,645 B2 | 10/2011 | Kurokawa | |
| 8,201,656 B2 | 6/2012 | Archer et al. | |
| 8,540,258 B2 | 9/2013 | Bae et al. | |
| 8,893,846 B2 | 11/2014 | Buchwitz et al. | |
| 9,096,110 B1* | 8/2015 | Bandy | B60G 9/00 |
| 9,694,676 B2* | 7/2017 | Bandy | B60G 3/202 |
| 9,718,353 B2* | 8/2017 | Bandy | B60K 17/348 |
| 2006/0169961 A1* | 8/2006 | Ledford | B66D 1/14 |
| | | | 254/342 |

OTHER PUBLICATIONS

Running925, Front Triangulated 4-link, no track bar?, pirate4x4.com/Jeep-Hardcore Tech, Feb. 12, 2013.
Simple72CJ, Project FIGJAM, pirate4x4.com/Jeep-Hardcore Tech, Feb. 17, 2018.
Tech Tim, Steering for Go-Fast Rigs, pirate4x4.com/General4x4 Discussion, Oct. 13, 2011.
Harry Wagner, Steering Solutions for Linked Suspensions, fourwheeler.com, Jun. 1, 2013.
Buzboom, Straight Axel Rack and Pinion, jalopyjournal.com/Traditional Hot Rods, Dec. 22, 2016.
Products, Manual and Power Rack and Pinions, howeperformance.com/Accessories, 2006.
Details, End-Take-Off Rack, unisteer.com/custom racks, 2019.
Details, Universal Electra-Steer 360w Kit, unisteer.com/Electric Power Steering. 2019.
Eric Hicks, Vivax-Assist Doped Electric Bike, electric-bike.com/gruber-assist, Jan. 25, 2017.
Doug Mahoney, What's So Great About Brushless Motor Power Tools?, popularmechanics.com/home/tools, Jan. 12, 2018.
Shafts & Supports, 24" Telescopic Shaft, borgeson.com/xcart/product.php?productid=994&cat=4&page=1, 2020.

* cited by examiner $$A\alpha = \frac{3.0}{2} \quad \text{(eq-1)}$$
$$= 1.5 \text{turns}$$

$$B\beta = 1.5 \text{turns} \cdot \left[\frac{360°}{1\text{turn}}\right] \quad \text{(eq-2)}$$
$$= 540°$$

$$\Gamma\gamma = 40° \cdot \left[\frac{35°}{540°}\right] \quad \text{(eq-3)}$$
$$= 2.6°$$

$$\Delta\delta = 20° \cdot \left[\frac{35°}{540°}\right] \quad \text{(eq-4)}$$
$$= 1.3°$$

FIG. 10

$$A\alpha = \frac{6.0}{2} \quad \text{(eq-1)}$$
$$= 3.0 \text{turns}$$

$$B\beta = 3.0 \text{turns} \cdot \left[\frac{360°}{1\text{turn}}\right] \quad \text{(eq-2)}$$
$$= 1080°$$

FIG. 11

$$\Gamma\gamma = 40° \cdot \left[\frac{35°}{1080°}\right] \quad \text{(eq-3)}$$
$$= 1.3°$$

$$\Delta\delta = 20° \cdot \left[\frac{35°}{1080°}\right] \quad \text{(eq-4)}$$
$$= 0.7°$$

FIG. 11 (cont)

$$E\varepsilon = \frac{6.0}{3.0} \quad \text{(eq-5)}$$
$$= 2:1$$

FIG. 12

AUGMENTED RACK AND PINION STEERING SYSTEM

CROSS-REFERENCE TO RELATED APPLICATIONS

This application represents a steering system specifically designed to operate in conjunction with a vehicle equipped with a front solid or beam axle and triangulated link-style suspension system.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The triangulated 4-link suspension system is the preferred front suspension system for a front solid axle four-wheel drive vehicle. A survey of the winningest, most competitive front solid axle four-wheel drive race vehicles quickly reveals that the front suspension system is based on the triangulated 4-link configuration. Despite such storied success in the off-road environment, the triangulated 4-link front (or rear) suspension system is not offered as a production-based or even as an optional performance-based suspension system by any automobile manufacturer of front solid axle four-wheel drive vehicles, e.g., Jeep, Ford, or Dodge Ram. More telling is that the triangulated 4-link front suspension system is rarely seen on one-off, custom-built front solid axle four-wheel drive vehicles that are driven on the street. In an era of street-legal race-inspired vehicles with sophisticated race-derived suspension systems—e.g., Corvette, Ferrari, Porsche, or even the highly-acclaimed Ford F-150 Raptor—the absence of the triangulated 4-link front suspension system on street-driven front solid axle four-wheel drive vehicles remains a mystery.

One of the challenges of using the triangulated 4-link front suspension system with street-driven four-wheel drive vehicles lies in the steering system. Most front solid axle four-wheel drive vehicles with the triangulated 4-link front suspension system utilize a full-hydraulic steering system. Full hydraulic steering is usually illegal and has a dubious reputation for street use. Instead of full-hydraulic steering, various mechanical alternative steering systems that feature bellcranks, gears and chains, or idler arms have been used to transmit steering input from the steering wheel to the steering knuckle. While the features may be unique, most mechanical alternative steering systems incorporate a draglink positioned in relation to one of the suspension links. The steering relationship between the draglink and suspension link is popularly known as the push/pull design as the draglink is pushed forward towards or pulled backward away from the front axle when the steering wheel is turned. This relationship between the draglink and suspension link gives rise to bumpsteer during articulation.

Bumpsteer during articulation can be visualized by considering the motions of the front axle, draglink, and suspension link during suspension travel and articulation. During suspension travel and articulation, the front axle moves in a vertical plane that is parallel to the lateral axis—hereafter called the lateral vertical plane. During suspension travel, as the axle moves upward and downward within the lateral vertical plane, the axle remains parallel to the ground. During articulation, the axle rotates within the lateral vertical plane about the longitudinal axis. The lateral axis refers to a line passing through the middle of the vehicle from the driver side to the passenger side while the longitudinal axis refers to a line passing through the middle of the vehicle from the front end to the back end.

For the triangulated 4-link suspension configuration, the draglink and suspension link both occupy a vertical plane that is angled to the lateral vertical plane—hereafter called the angled vertical plane; the angle commonly being between 40-90 degrees)(40°-90°, depending on the geometry of the suspension links. During suspension travel, the parallel relationship between the front axle and ground enables the draglink to move vertically in concert with the suspension link such that the draglink and suspension link follow similar arcs. The similar arcs define coincident motion that results in zero bumpsteer. During articulation since the angled vertical plane is angled to the lateral vertical plane, then rotation of the front axle within the lateral vertical plane causes the draglink to wrap around the suspension link in a twisting motion (like the double helix of DNA or the twisted shape of licorice). The twisting motion causes the draglink and suspension link to follow dissimilar arcs. The dissimilar arcs define non-coincident motion that results in bumpsteer.

The mechanical alternative steering systems, while being more complicated than a simple steering box and drag link design, have seen duty in some production-based models from Toyota, G M, and Jeep, and also in some solid-axle desert race trucks. The push/pull steering designs are not well-received because the factory versions, such as those by Toyota and GM, were very short and included multiple drag links and tie-rod ends. The short length limited the amount of suspension travel while the multiple ends easily loosened, the combination of which led to sloppy steering that could bind and fail during off-road driving.

A variant of the mechanical alternative steering systems involves a rack and pinion steering system in which the recirculating ball steering gearbox is replaced with a rack and pinion steering gearset. Rack and pinion steering systems have a long history with older straight beam-axle vehicles such as hot rods. Rack and pinion steering systems are less expensive and more precise than their recirculating ball steering system counterparts. The rack and pinion gearset is attached directly to the front solid or beam axle such that the rack is connected directly to the draglink or tie rods. This arrangement of a direct attachment between the rack and pinion gearset and front solid axle defines the steering system that is disclosed in U.S. Pat. No. 5,934,404. Direct attachment offers two distinct benefits over the recirculating ball steering systems:

One, in the rack and pinion steering system, the draglink is located entirely on the front axle, thereby eliminating the requirement of concerted motion between the draglink and triangulated suspension link. The steering shaft, which transmits steering input from the chassis to the rack and pinion gearset on the front axle, rotates rather than pushes and pulls. This way, steering input is transmitted via a rotational motion rather than a push and pull motion. The steering shaft is equipped with a slip-joint thereby enabling the length of the steering shaft to increase and decrease in concert with the forwards and backwards motion of the front axle during suspension travel, respectively. Thus during suspension travel, the change in length of the steering shaft enables the steering shaft to move vertically in concert with the suspension link such that the steering shaft and suspension link follow similar arcs. The similar arcs define coincident motion that results in zero bumpsteer. Therefore when used with a slip-joint equipped steering shaft, the front axle-mounted rack and pinion gearset invokes zero bumpsteer during suspension travel.

Two, the rack undergoes true linear displacement along the lateral axis such that any displacement of the rack causes a likewise displacement of the tie rod and thereby steering arm on the steering knuckle. Conversely, the pitman arm that is attached to the sector shaft of a recirculating ball gearbox undergoes rotational displacement at the draglink end. The rotational displacement defines an angled pitman arm that can be resolved into X- and Y-components. Let the X-component refer to the displacement that occurs along the lateral axis while the Y-component refers to the displacement that occurs along the longitudinal axis. The lateral displacement of the X-component refers to lateral displacement of the draglink end, and causes a likewise displacement of the tie rod and thereby lateral displacement of the steering arm on the steering knuckle. The longitudinal displacement of the Y-component occurs at a right angle to the lateral displacement of the X-component. The longitudinal displacement of the Y-component refers to longitudinal displacement of the draglink end, and has no effect on the lateral displacement of the tie rod and steering arm on the steering knuckle. Therefore, the longitudinal displacement of the Y-component defines useless motion of the pitman arm, thereby reducing the steering precision of the recirculating ball gearbox when compared to the rack and pinion gearset.

Rack and pinion gearsets are available as manual rack and pinion gearsets, electric power assisted rack and pinion gearsets, or hydraulic power assisted rack and pinion gearsets. Manual rack and pinion gearsets are simple mechanical devices comprising a toothed pinion shaft meshing with a toothed rack. The meshing process defines an interaction between the teeth on the pinion shaft and those on the rack such that the rotation of the pinion shaft causes a linear displacement of the rack. That is, the rotational torque of the steering input defines a torque (rotational) force that is exerted on the pinion shaft, which causes the pinion shaft to rotate. The pinion shaft exerts the torque force on the rack during the meshing process, thereby causing the rack to be displaced in a linear fashion. Hereafter, the torque force exerted on the rack by the pinion shaft is known as the pinion shaft force. The displacement of the rack causes the pinion shaft force to be exerted on the draglink (or tie rods) thereby displacing the draglink (or tie rods). The displacement of the draglink (or tie rods) causes the pinion shaft force to be exerted on the steering arms thereby displacing the steering arms and turning the vehicle. The manual rack and pinion gearset defines the basic construction of any rack and pinion gearset. Electric power assisted rack and pinion gearsets are manual gearsets whose pinion shaft is connected to an electric motor. The electric motor multiplies the rotational torque of the pinion shaft. The multiplied rotational torque of the pinion shaft defines a multiplied pinion shaft force, which facilitates displacement of the rack and greatly eases the turning of the vehicle with the steering wheel. Hydraulic power assisted rack and pinion gearsets utilize hydraulic fluid to generate a hydraulic pressure force. The hydraulic pressure force is exerted on the rack, which facilitates displacement of the rack and greatly eases the turning of the vehicle with the steering wheel.

For hydraulic power assisted rack and pinion gearsets, a control valve regulates the flow of hydraulic fluid. The hydraulic fluid refers to hydraulic pressure while the hydraulic pressure defines a force. Hereafter, the force defined by the hydraulic pressure is known as the hydraulic pressure force. The hydraulic fluid regulating function in the control valve varies the fluid flow, which varies the hydraulic pressure, which in turn varies the hydraulic pressure force. The hydraulic pressure force is exerted on the rack which displaces the rack. Two versions of the hydraulic power assisted rack and pinion gearset are described:

In one version, the control valve is an integral part of the gearset. The hydraulic fluid regulating function in the control valve occurs in the housing comprising the rack. Therefore, the hydraulic pressure and hydraulic pressure force are generated in the housing comprising the rack. The hydraulic pressure force is exerted on the rack, which displaces the rack.

In a second version, a hydraulic ram is connected to the rack and the control valve is not an integral part of the gearset; i.e., the control valve is an independent device that may or may not be attached to the gearset. Hydraulic fluid passes from the control valve to the ram such that the hydraulic pressure is generated in the ram. The hydraulic pressure in the ram defines the hydraulic pressure force that is exerted on the rack, which displaces the rack.

In either version, the control valve and rack and pinion gearset are constructed in a manner such that the hydraulic fluid regulating function in the control valve is activated by and responds to the displacement of the rack due to the pinion shaft force, i.e. the hydraulic fluid regulating function in the control valve is coordinated with the displacement of the rack due to the pinion shaft force. This way, the hydraulic pressure variance in the housing/ram is coordinated with the displacement of the rack due to the pinion shaft force. This means that the displacement of the rack due to the hydraulic pressure force is coordinated with the displacement of the rack due to the pinion shaft force. Therefore, the hydraulic pressure force is coordinated with the pinion shaft force. Coordination between the hydraulic pressure force and pinion shaft force defines a combined hydraulic pressure force and pinion shaft force that is greater than either the hydraulic pressure force or pinion shaft force alone. The combined hydraulic pressure force and pinion shaft force refer to a multiplied force that is exerted on the rack and thereby effortlessly displaces the rack. The effortless displacement of the rack exerts the multiplied force onto the draglink (or tie rods) and then on the steering arms, which effortlessly turn the vehicle.

Currently, all rack and pinion steering systems comprise features unsuitable for use on a front solid axle four wheel drive vehicle. Front solid axle four wheel drive vehicles, especially those targeted for off-road driving, comprise heavy duty drivetrains with large oversized wheels. The front wheels are the first vehicle components that contact a road obstruction, and thereby endure the brunt of the impact; the impact including extreme vibration, jarring shocks, and sudden and rapid vertical or articulating motion. Since the front wheels are connected to the front solid axle, then the front solid axle is also subject to extreme vibration, jarring shocks, and sudden and rapid vertical or articulating motion.

The manual rack and pinion gearsets and electric power assisted rack and pinion gearsets are constructed with light-weight, low-strength materials designed for vehicles weighing 4500 lbs or less and rolling on 32" or smaller wheels. The light-weight, low-strength materials cannot withstand the intense workloads from the heavy duty drivetrains and large oversized wheels of front solid axle four wheel drive vehicles.

The one version of the hydraulic power assisted rack and pinion gearset is constructed such that the control valve is an integral part of the gearset and hydraulic fluid passes through the housing comprising the rack. The control valve is a highly-machined hydraulic fluid regulating device that defines the precise response of the steering system. Since the gearset is attached to the front axle, the control valve is also subject to extreme vibration, jarring shocks, and sudden and rapid vertical or articulating motion. Such adverse conditions erode steering precision and quickly ruin the control valve. This deficiency represents a key issue that is addressed in U.S. Pat. No. 6,189,902.

The second version of the hydraulic power assisted rack and pinion gearset, such as that offered by performance steering manufacturers, is constructed with a quick steering ratio of 1.5:1 or 1.0:1. The quick steering ratio defines a quick steering response from the front wheels, and thereby steering precision. The quick steering ratio also means that the displacement of the rack is magnified. A small turn of the steering wheel causes a small rotation of the pinion shaft. Then the small rotation of the pinion shaft is magnified by the quick steering ratio and thereby causes a large displacement of the rack. When the steering wheel is not turned, then during articulation as the axle rotates about the longitudinal axis, the gearset also rotates about the longitudinal axis but not the pinion shaft. The rotating gearset simulates the rotation of the pinion shaft. The simulated rotation of the pinion shaft causes an unintended displacement of the rack, which leads to an unintended turn of the front wheels. In short during articulation when driving straight ahead, the rotating gearset simulates the rotation of the pinion shaft which causes an unintended displacement of the rack. During articulation when driving straight ahead, the unintended displacement of the rack is the single greatest deficiency of the axle mounted rack and pinion gearset—it results in bumpsteer. Any small amount of articulation refers to a small simulated rotation of the pinion shaft. The small simulated rotation of the pinion shaft is magnified by the quick steering ratio and thereby causes a large unintended displacement of the rack, which leads to a large unintended turn of the front wheels. Since the articulation of the axle, and NOT the turning of the steering wheel, led to the large turn of the front wheels, then the large turn of the front wheels is unintended and thereby defines bumpsteer.

Clearly, the historical record and U.S. Pat. Nos. 5,934,404 and 6,189,902 demonstrate that the rack and pinion steering system represents a viable steering system for front solid axle vehicles. By resolving the deficiencies cited above, the rack and pinion steering system also represents a viable steering system for front solid axle four wheel drive vehicles. The present invention disclosed herein is a rack and pinion steering system devoid of the cited deficiencies. The disclosure represents a power assisted variant of the rack and pinion steering system introduced in our related U.S. Pat. No. 9,096,110, and can operate in conjunction with the well-known triangulated link-style suspension system with negligible if any bumpsteer.

BRIEF SUMMARY OF THE INVENTION

Particular arrangements of the present invention define a steering system that includes a rack and pinion gearset, augmented chain and sprocket assembly, electric and hydraulic power assist devices, and linkages, the system governing the steering for a front solid axle equipped vehicle.

Components of the steering system and properties of the components include the following:

The rack and pinion gearset is known in the art, and is constructed with a slow steering ratio. The basic operation of the rack and pinion gearset involves a toothed pinion shaft meshing with a toothed rack. During the meshing process, the pinion shaft interacts with the rack such that the rotation of the pinion shaft causes a linear displacement of the rack. The slow steering ratio means that for a small rotation of the pinion shaft, the displacement of the rack is very small. This way, a small rotation of the pinion shaft causes a very small displacement of the rack, which leads to a very small turn of the front wheels. Articulation of the front axle during ordinary driving conditions (street or mild off-road driving conditions) renders a small rotation of the rack and pinion gearset. Then when the steering wheel is not turned, the small rotation of the rack and pinion gearset simulates a small rotation of the pinion shaft. The small simulated rotation of the pinion shaft is reduced by the slow steering ratio and thereby causes a very small unintended displacement of the rack, which leads to a very small unintended turn of the front wheels. The very small unintended turn of the front wheels is due to articulation and thereby defines negligible bumpsteer.

The augmented chain and sprocket assembly quickens the steering input that is supplied by the driver. The augmented chain and sprocket assembly is a type of steering quickener. The quickening property acts to multiply steering input and is called augmentation. For every rotation of the steering wheel, rotation of the pinion shaft is multiplied by the amount of the augmentation. The multiplied rotation of the pinion shaft causes an increased displacement of the rack, which leads to an increased turn of the front wheels. The augmented chain and sprocket assembly has input and output shafts whereby the augmentation makes the rotation of the output shaft by the input shaft more difficult. The augmented chain and sprocket assembly is able to include an electric motor. The electric motor is located next to the input shaft or output shaft such that the electric motor can exert a torque force on the input shaft or output shaft, respectively. The torque force multiplies the rotational torque from the steering input, thereby facilitating the rotation of the input shaft or output shaft.

The electric power assist device is an electric assist motor box. The electric assist motor box is known in the art, and is able to be connected, via steering shaft, to the pinion shaft of the manual rack and pinion gearset. The electric assist motor box multiplies the rotational torque of the pinion shaft. The multiplied rotational torque of the pinion shaft defines a multiplied pinion shaft force. The multiplied pinion shaft force is exerted on the rack during the meshing process, and thereby results in effortless displacement of the rack.

The rack and pinion gearset is able to be a known manual rack and pinion gearset with the slow steering ratio. The manual rack and pinion gearset defines a simple mechanical device comprising a toothed pinion shaft meshing with a toothed rack, the meshing process is common to any rack and pinion gearset. The gearset can reliably withstand the adverse off-road conditions experienced by the front solid axle of light-weight four wheel drive vehicles, light-weight referring to vehicles with a gross weight up to 4500 lbs and rolling on wheels up to 32" in diameter—e.g., Jeep Wrangler.

The rack and pinion gearset is able to be a known ram assist rack and pinion gearset with the slow steering ratio. The hydraulic power assist device is the ram, and the hydraulic fluid is governed by a control valve. The control valve is remotely located from the gearset; specifically, the control valve is attached to the chassis and NOT to the gearset. The remote location isolates the control valve from the front axle and removes the hydraulic fluid regulating function from the gearset. By remotely locating the control valve, the ram assist rack and pinion gearset is converted into a simple mechanical device that includes a toothed pinion shaft that meshes with a toothed rack and a ram that is attached to the rack and tie rod bar. The hydraulic pressure force of the ram combines with the pinion shaft force to define a multiplied force that is exerted on the tie rod bar. The multiplied force of the tie rod bar effortlessly displaces the tie rod bar, which leads to the effortless turning of the vehicle with the steering wheel. The hydraulic pressure force of the ram makes the ram assist rack and pinion gearset a very robust type of rack and pinion gearset. The ram assist rack and pinion gearset defines a mechanically actuated analog of the full hydraulic steering ram commonly used on front solid axle four wheel drive vehicles. The ram assist rack and pinion gearset is ideally suited to handle the heavy duty drivetrains and large oversized wheels characteristic of four wheel drive vehicles; vehicles with a gross weight greater than 4500 lbs and rolling on wheels greater than 33" in diameter—e.g., Ford Super Duty trucks or Ram Heavy Duty trucks.

A first particular arrangement defines a steering system that includes the manual rack and pinion gearset, augmented chain and sprocket assembly, electric assist motor box, and associated linkages. The linkages include a coupler shaft, steering shaft, draglink, and tie rod. The manual rack and pinion gearset has a slow steering ratio while the augmented chain and sprocket assembly has an electric motor. The electric assist motor box is remotely located away from the gearset, thereby removing the electric power assist motor box from the front axle and preserving precise steering response during adverse driving conditions. Steering input is transmitted from the steering column to the augmented chain and sprocket assembly, from the augmented chain and sprocket assembly to the electric assist motor box, from the electric assist motor box to the manual rack and pinion gearset, and from the manual rack and pinion gearset to the front wheels. Rotational torque that is derived from the steering input is multiplied by both the electric motor and electric assist motor box. The multiplied rotational torque from the electric motor is exerted on the output shaft of the augmented chain and sprocket assembly, thereby resulting in effortless rotation of the output shaft. The multiplied rotational torque from the electric assist motor box is exerted on the pinion shaft, which defines a multiplied pinion shaft force. The multiplied pinion shaft force is exerted on the rack during the meshing process, and thereby results in effortless displacement of the rack. The combination of the effortless rotation of the output shaft and effortless displacement of the rack facilitates the turning of the vehicle with the steering wheel. The combined effects of the steering quickener augmented chain and sprocket assembly and slow ratio manual rack and pinion gearset results in a steering system with quick steering response with negligible if any bumpsteer during ordinary driving conditions.

A second particular arrangement defines a steering system that includes the ram assist rack and pinion gearset, augmented chain and sprocket assembly, and associated linkages. The linkages include a coupler shaft, steering shaft, draglink, and tie rod. The ram assist rack and pinion gearset has a slow steering ratio, control valve, and tie rod bar while the augmented chain and sprocket assembly has an electric motor. The control valve is remotely located away from the gearset, thereby removing the hydraulic fluid regulating function from the front axle and preserving precise steering response during adverse driving conditions. Steering input is transmitted from the steering column to the augmented chain and sprocket assembly, from the augmented chain and sprocket assembly to the control valve, from the control valve to the ram assist rack and pinion gearset, and from the ram assist rack and pinion gearset to the front wheels. Rotational torque that is derived from the steering input is multiplied by the electric motor at the output shaft of the augmented chain and sprocket assembly, thereby resulting in effortless rotation of the output shaft. The ram exerts a hydraulic pressure force on the tie rod bar, which in coordination with the pinion shaft force defines a multiplied force that results in effortless displacement of the tie rod bar. The combination of the effortless rotation of the output shaft and effortless displacement of the tie rod bar facilitates the turning of the vehicle with the steering wheel. The combined effects of the steering quickener augmented chain and sprocket assembly and slow ratio ram assist rack and pinion gearset results in a steering system with quick steering response with negligible if any bumpsteer during ordinary driving conditions.

BRIEF DESCRIPTION OF THE SEVERAL VIEWS OF THE DRAWING

Brief Description of the Drawings

Figure 1:
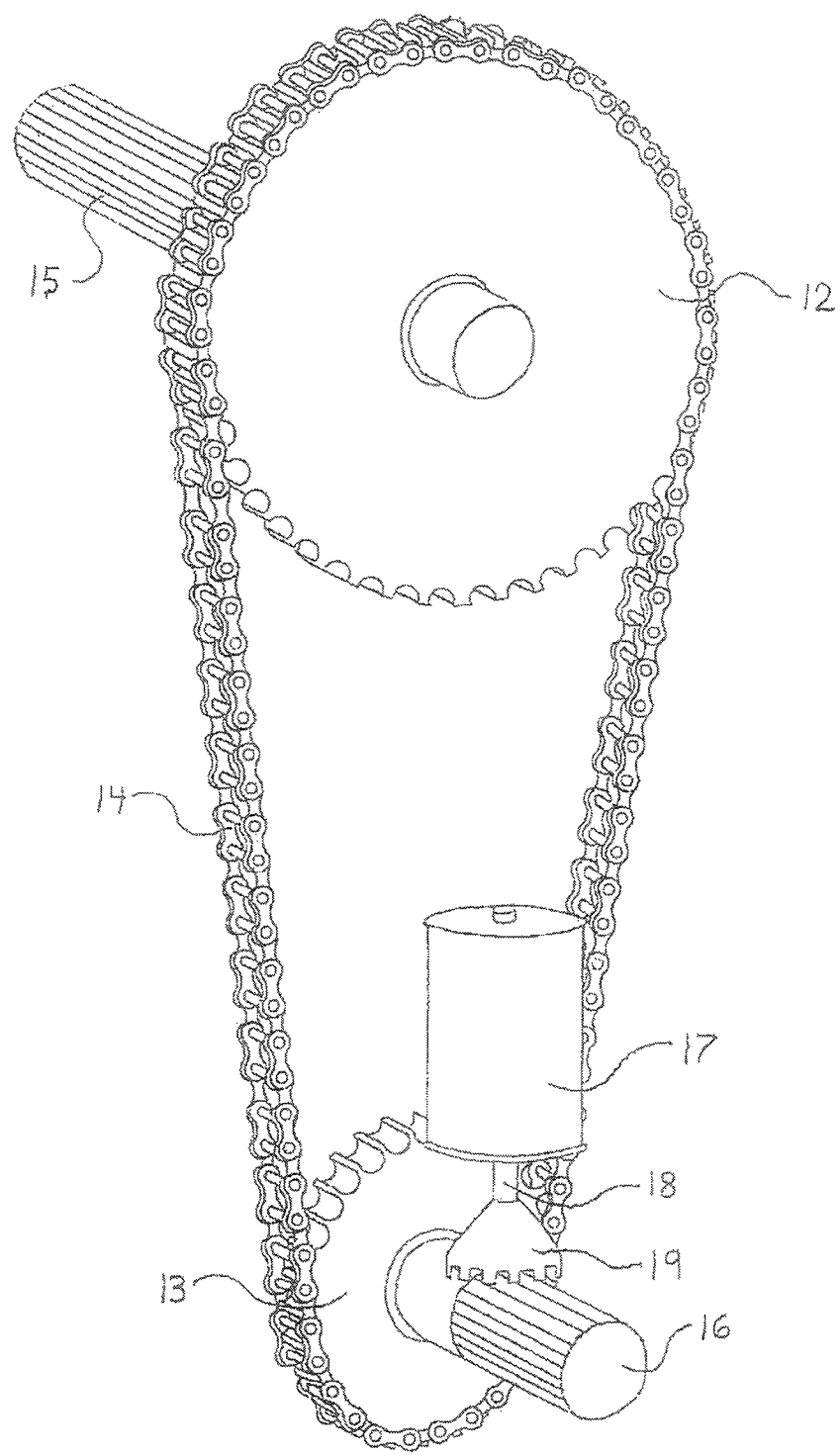
Figure 2:
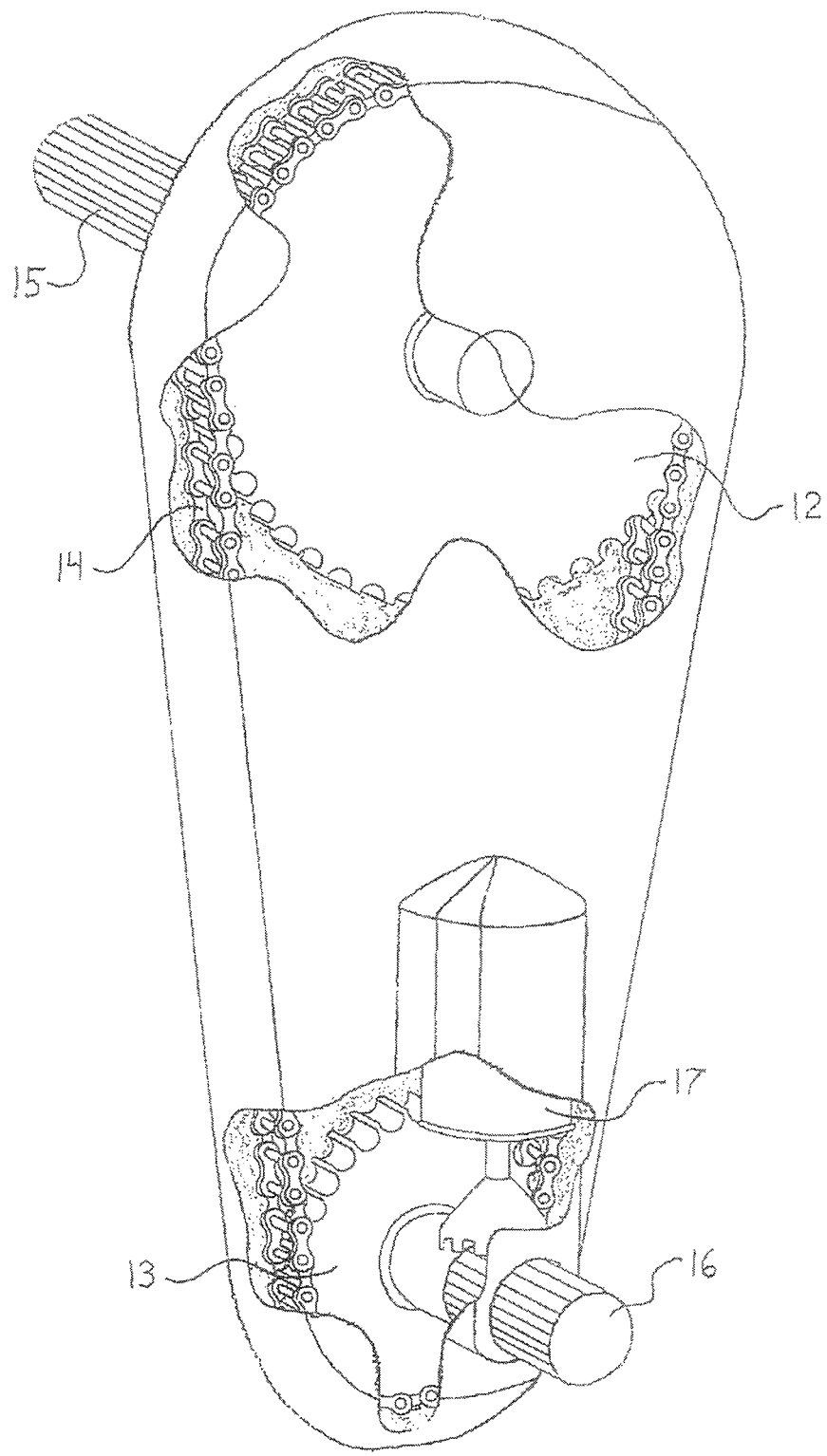
Figure 3:
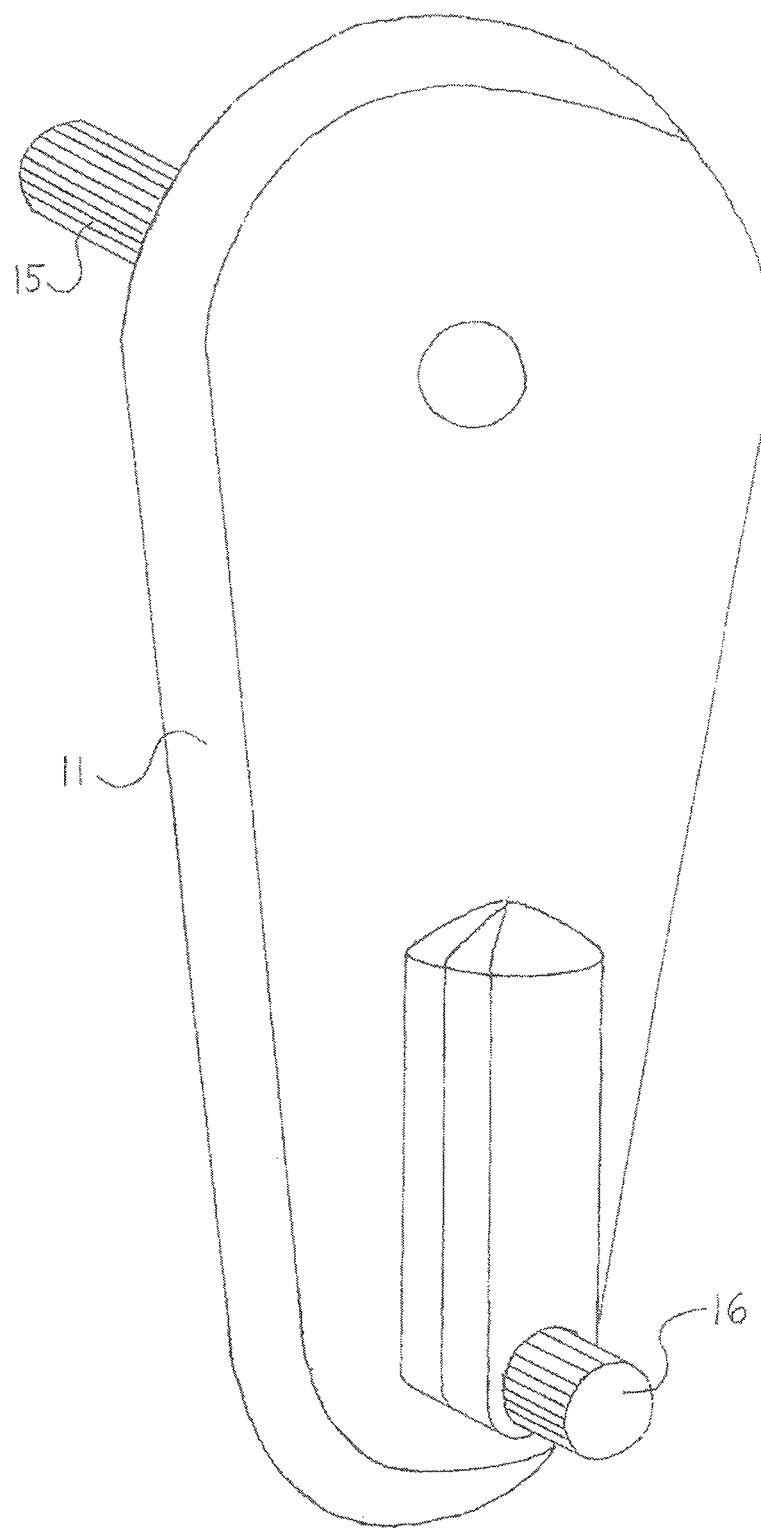
Figure 4:
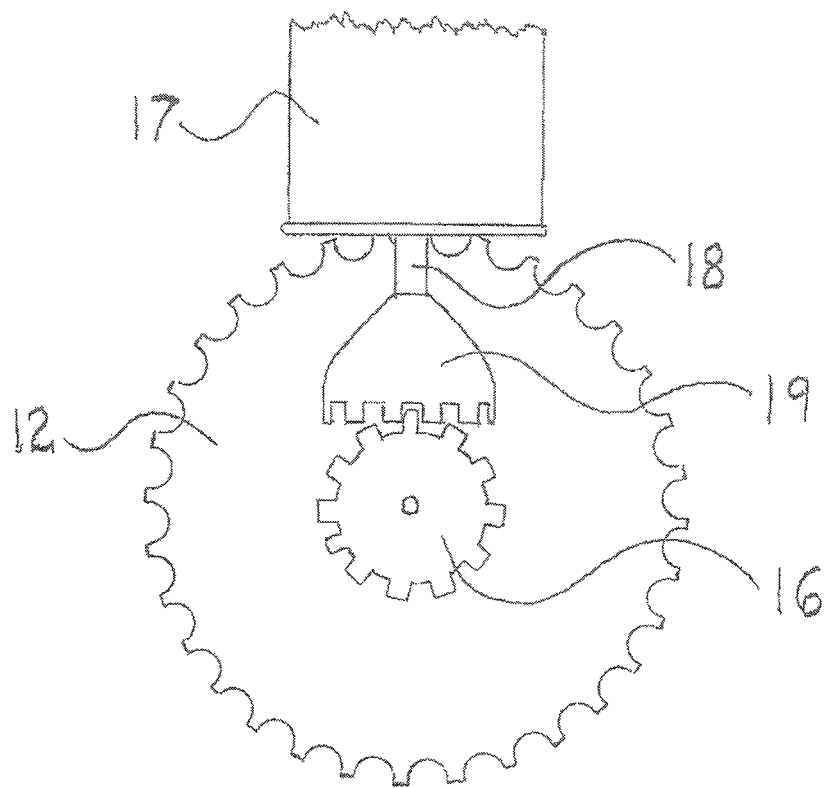
Figure 5:
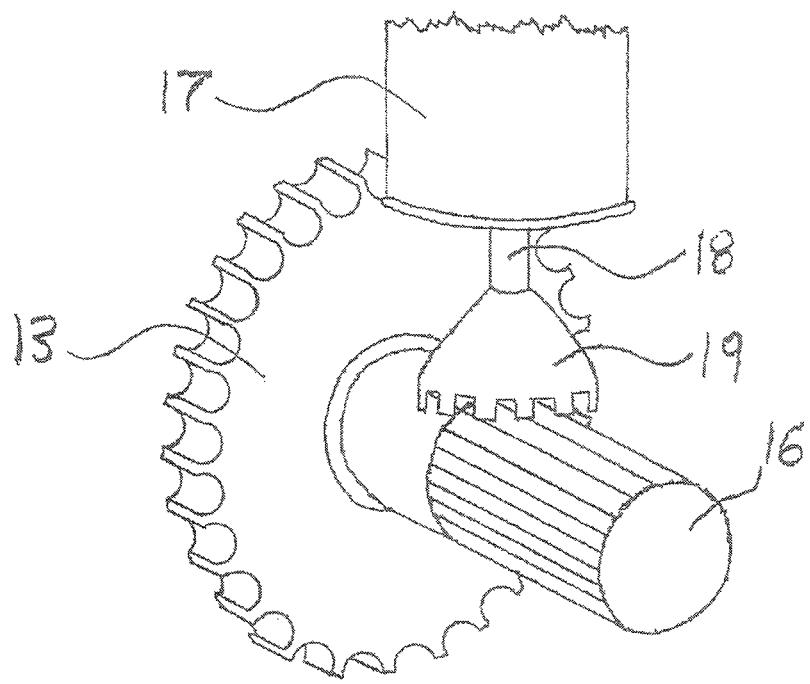
Figure 6:
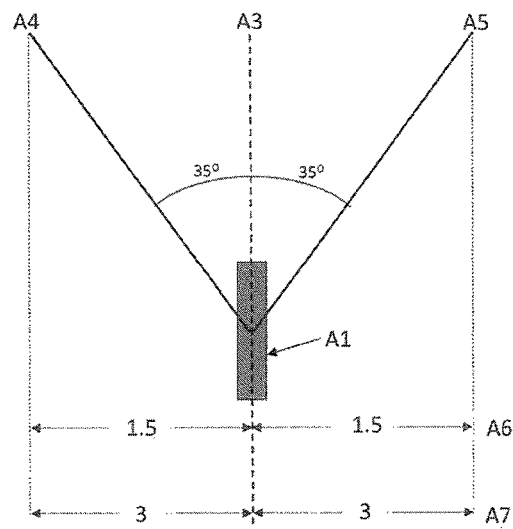
Figure 7:
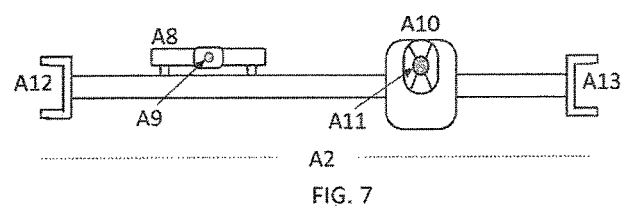
Figure 8:
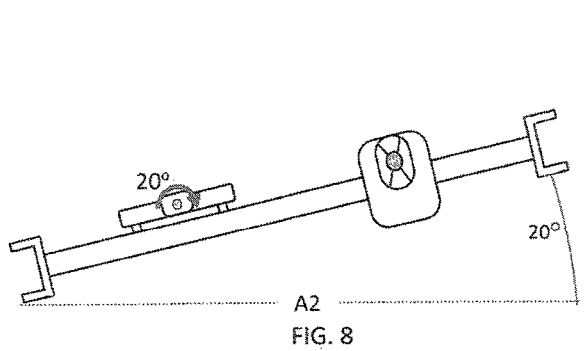
Figure 9:
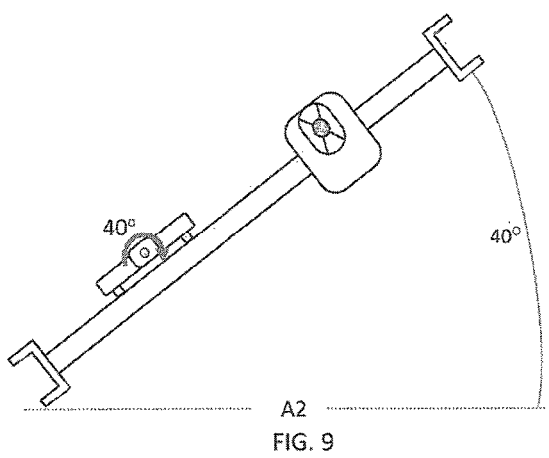
Figure 13:
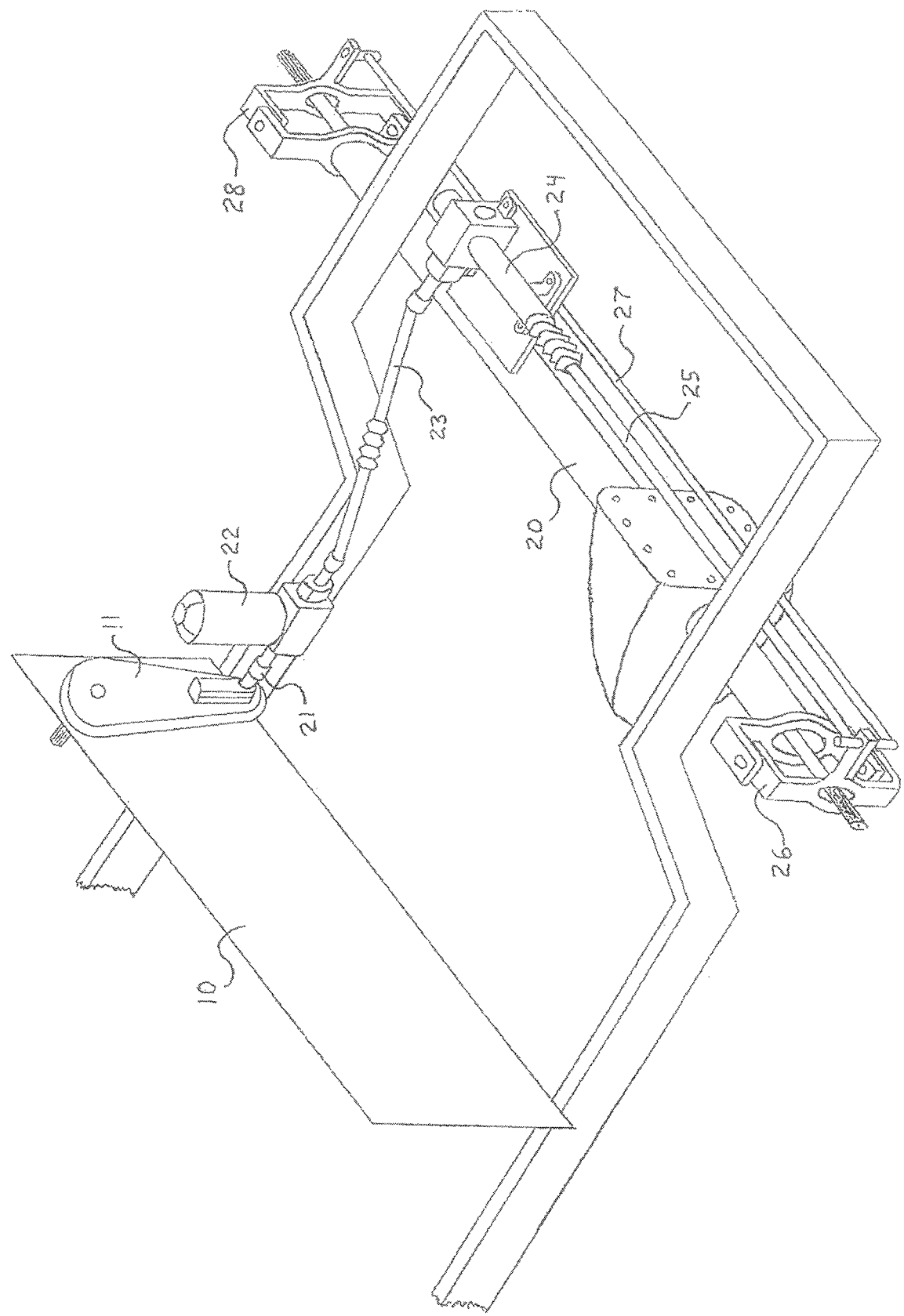
Figure 14:
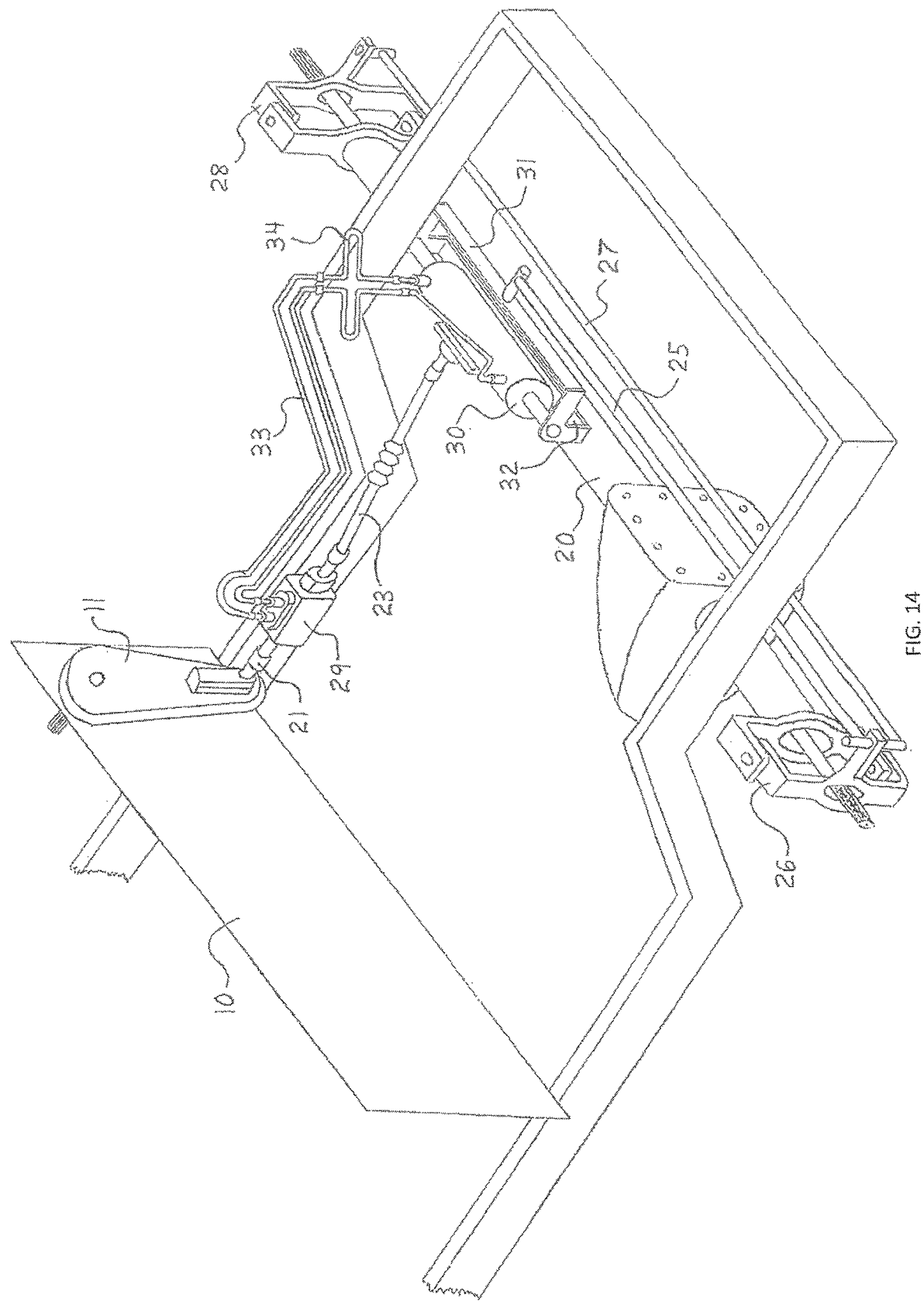

It is appreciated that these drawings depict only illustrated embodiments of the invention and are therefore not limited to the precise arrangements and instrumentalities shown:

FIG. 1 is a front side perspective view of the internal components for the augmented chain and sprocket assembly;

FIG. 2 is a front side perspective view of the cut-away augmented chain and sprocket assembly;

FIG. 3 is a front side perspective view of the augmented chain and sprocket assembly;

FIG. 4 is a front view of the output shaft and electric motor for the augmented chain and sprocket assembly;

FIG. 5 is a side perspective view of the output shaft and electric motor for the augmented chain and sprocket assembly;

FIG. 6 is a top down view of the turning radius of one of the front wheels;

FIG. 7 is a backside view of the front axle that is parallel to the ground;

FIG. 8 is a backside view of the front axle that is articulated 20 degrees;

FIG. 9 is a backside view of the front axle that is articulated 40 degrees;

FIG. 10 is an algorithm for computing bumpsteer for a steering ratio of 3:1;

FIG. 11 is an algorithm for computing bumpsteer for a steering ratio of 6:1;

FIG. 12 is equation 6 that is used to compute the augmentation of the augmented chain and sprocket assembly;

FIG. 13 is a front side perspective view of the first particular arrangement of the steering system;

FIG. 14 is a front side perspective view of the second particular arrangement of the steering system.

DETAILED DESCRIPTION OF THE INVENTION

The present invention represents a steering system designed to function with a vehicle whose frame is suspended above front and rear solid or beam type axles, the front axle being steerable. The steering system utilizes mechanical linkages and is specifically designed to operate in conjunction with a triangulated link-style suspension system.

For discussion purposes: One, only the front portion of a chassis is shown in the drawings, and includes part of the driver and passenger frame sides, front end of the frame, and firewall 10. Two, the front suspension system is not shown in the drawings. While a front solid axle is disposed beneath the chassis as appropriate, the axle is not connected to the chassis via suspension control links. Three, the electric motor 17 that is able to be oriented adjacent to either the input shaft 15 or output shaft 16 of the augmented chain and sprocket assembly 11 is oriented adjacent to the output shaft 16 only. Four, maximum articulation of the front axle during off-road driving is 40 degrees (40° max) while that during street driving is 20 degrees (20° max). Five, rotation or turning of the steering wheel (not shown) by the driver refers to steering input, and generates a rotational torque.

The present invention utilizes a known rack and pinion gearset with a slow steering ratio. The known rack and pinion gearset is able to be a manual rack and pinion gearset 24 or ram assist rack and pinion gearset 30. For each gearset, a toothed pinion shaft meshes with a toothed rack. The meshing process defines an interaction between the teeth on the pinion shaft and those on the rack such that the rotation of the pinion shaft causes a linear displacement of the rack. The interaction involves: The rotational torque of the steering input defines a torque (rotational) force that is exerted on the pinion shaft, which causes the pinion shaft to rotate. By causing the pinion shaft to rotate, the torque force of the steering input is transmitted to the pinion shaft such that the torque force now becomes the rotational torque or torque force of the pinion shaft. The pinion shaft exerts the torque force on the rack during the meshing process, thereby causing the rack to be displaced in a linear fashion. The torque force of the pinion shaft is known as the pinion shaft force.

For the manual rack and pinion gearset 24, the rack is connected to the draglink 25 and the draglink 25 is connected to the passenger-side steering knuckle 26. The passenger-side steering knuckle 26 is connected to the driver-side steering knuckle 28 via the tie rod 27. The displacement of the rack displaces the draglink 25 which displaces the passenger-side steering knuckle 26, and driver-side steering knuckle 28 via the tie rod 27, thereby causing the front wheels (not shown) to turn.

For the ram assist rack and pinion gearset 30, the hydraulic fluid, generates hydraulic pressure in the ram which defines a hydraulic pressure force of the ram. The hydraulic fluid regulating function in the control valve 29 varies the hydraulic pressure in the ram which in turn varies the hydraulic pressure force of the ram. The ram exerts the hydraulic pressure force on the rack 32, which displaces the rack 32. The hydraulic pressure force and pinion shaft force are separate and independent forces, yet they both act to displace the rack 32 at the same time. Since the rack 32 cannot undergo two different displacements at the same time (obviously physically impossible), then the displacement of the rack 32 due to the hydraulic pressure force must be the same as that due to the pinion shaft force; i.e., the displacement of the rack 32 due to the hydraulic pressure force must be coordinated with that due to the pinion shaft force. In short, the hydraulic pressure force must be coordinated with the pinion shaft force. Without coordination between the hydraulic pressure force and pinion shaft force, the displacement of the rack 32 due to the hydraulic pressure force is different from that due to the pinion shaft force. The difference between the displacement of the rack 32 due to the hydraulic pressure force and that due to the pinion shaft force would immediately destroy the ram assist rack and pinion gearset 30.

The ram assist rack and pinion gearset 30 (specifically, control valve 29 and ram assist rack and pinion gearset 30) are constructed in a manner such that the hydraulic fluid regulating function in the control valve 29 is activated by and responds to the displacement of the rack 32 due to the pinion shaft force. This means that the hydraulic fluid regulating function in the control valve 29 is coordinated with the displacement of the rack 32 due to the pinion shaft force, i.e., the hydraulic pressure variance in the ram is coordinated with the displacement of the rack 32 due to the pinion shaft force—as the displacement of the rack 32 due to the pinion shaft force varies, the hydraulic pressure varies. This way, the displacement of the rack 32 due to the hydraulic pressure force is coordinated with that due to the pinion shaft force, thereby establishing that the hydraulic pressure force is coordinated with the pinion shaft force. Problems can arise when a hydraulic assist rack and pinion gearset is constructed in a manner such that the rotation of the input shaft for the control valve governs the hydraulic fluid regulating process. Such a hydraulic pressure management system fails to coordinate with the displacement of the rack due to the pinion shaft force during articulation of the axle when driving straight ahead. During articulation of the axle when driving straight ahead, the input shaft and pinion shaft do not rotate and yet the rack is displaced due to the rotation of the rack and pinion gearset, i.e., simulated rotation of the pinion shaft. Since the input shaft does not rotate while the rack is displaced, then the hydraulic pressure variance is not coordinated with the displacement of the rack due to the pinion shaft force; i.e., the hydraulic pressure force is not coordinated with the pinion shaft force.

Coordination between the hydraulic pressure force and pinion shaft force defines a combined hydraulic pressure force and pinion shaft force that is greater than either the hydraulic pressure force or pinion shaft force alone. The combined hydraulic pressure force and pinion shaft force refer to a multiplied force that is exerted on the rack 32. The ram is connected to the rack 32 and tie rod bar 31 while the tie rod bar 31 is connected to the draglink 25. This way, the rack 32 is connected to the tie rod bar 31 such that the multiplied force that is exerted on the rack 32 refers to the multiplied force being exerted on the tie rod bar 31. The multiplied force that is exerted on the tie rod bar 31 results in the effortless displacement of the tie rod bar 31 and refers to the multiplied force of the tie rod bar 31. The multiplied force of the tie rod bar 31 is exerted on the draglink 25 and then on the passenger-side steering knuckle 26, and driver-side steering knuckle 28 via the tie rod 27, which effortlessly turn the vehicle Steering input passes through the steering shaft 23 and then the pinion shaft. Since the steering shaft 23 is connected to the pinion shaft, then the rotational motion of the steering input refers to the rotational motion of the steering shaft 23 while the rotational motion of the steering shaft 23 defines the rotational motion of the pinion shaft. This way, the steering shaft 23 and pinion shaft each transmit steering input via a rotational motion. The steering shaft 23 is equipped with a slip-joint thereby enabling the length of the steering shaft 23 to increase and decrease. The rotational motions of the steering shaft 23 and pinion shaft occur at a right angle to the length of the steering shaft 23 such that the rotations of the steering shaft 23 and pinion shaft are independent of and not influenced by the change in length of the steering shaft 23. This way during suspension travel, the change in length of the steering shaft 23 does not cause any unintended rotation of the pinion shaft. Specifically, during suspension travel, the change in length of the steering shaft 23 does not cause any unintended displacement of the rack—does not cause any bumpsteer.

In other words during suspension travel, the motion of the steering shaft 23 is coincident with that of the front suspension links, thereby resulting in zero bumpsteer. Consider: The front suspension links and steering shaft 23 each comprise one and the other ends. This way, the front suspension links are attached to the chassis at one end and the front axle 20 at the other end such that during suspension travel, the front suspension links move in an arc thereby causing the front axle 20 to also move in an arc. The arc followed by the front suspension links defines the arc followed by the front axle 20, which involves forwards and backwards motion as well as up and down motion. Likewise in effect, the steering shaft 23 is attached to the chassis at one end and the front axle 20 at the other end such that during suspension travel, the steering shaft 23 moves in an arc. The change in length of the steering shaft 23 enables the arc followed by the steering shaft 23 to be similar to the arc followed by the front suspension links. That is, the change in length of the steering shaft 23 enables the steering shaft 23 to move forwards, backwards, up, and down in concert with the front suspension links such that the steering shaft 23 and front suspension links follow similar arcs. The similar arcs define coincident motion that results in zero bumpsteer.

This means any rack and pinion gearset that is connected to a slip-joint equipped steering shaft can operate without invoking any bumpsteer during suspension travel. That is, the front axle-mounted rack and pinion gearset invokes zero bumpsteer during suspension travel. Therefore, the manual rack and pinion gearset 24 and ram assist rack and pinion gearset 30 invoke zero bumpsteer during suspension travel.

Driving without turning the steering wheel refers to driving straight ahead. When driving straight ahead, the articulation of the axle defines a rotation of the axle while the pinion shaft does not rotate. That is when driving straight ahead, the articulation of the axle defines a rotation of the rack and pinion gearset while the pinion shaft does not rotate. Rotation of the rack and pinion gearset while the pinion shaft does not rotate is functionally identical to rotation of the pinion shaft while the rack and pinion gearset does not rotate, which defines the normal operation of a rack and pinion gearset. Therefore, rotation of the rack and pinion gearset while the pinion shaft does not rotate refers to the simulated normal operation of a rack and pinion gearset. Specifically, the rotation of the rack and pinion gearset while the pinion shaft does not rotate refers to the simulated rotation of the pinion shaft. When driving straight ahead, the articulation of the axle causes a rotation of the rack and pinion gearset while the pinion shaft does not rotate, and thereby refers to the simulated rotation of the pinion shaft, i.e., when driving straight ahead, the articulation of the axle causes a rotation of the rack and pinion gearset and thereby refers to the simulated rotation of the pinion shaft. The simulated rotation of the pinion shaft causes an unintended displacement of the rack. When driving straight ahead, the articulation of the axle causes a rotation of the rack and pinion gearset while the pinion shaft does not rotate, and thereby refers to the simulated rotation of the pinion shaft, which causes an unintended displacement of the rack. In short when driving straight ahead, the articulation of the axle causes a rotation of the rack and pinion gearset and thereby refers to a simulated rotation of the pinion shaft, which causes the unintended displacement of the rack. The unintended displacement of the rack leads to an unintended turn of the front wheels. The unintended turn of the front wheels defines bumpsteer. Conclusion—the single greatest deficiency of the axle mounted rack and pinion gearset is: when driving straight ahead, the articulation of the axle causes the unintended displacement of the rack, which leads to an unintended turn of the front wheels, i.e., bumpsteer.

The slow steering ratio is essential because it negates the single greatest deficiency of a rack and pinion gearset that's attached to the front axle—propensity for bumpsteer during articulation. The steering ratio refers to the displacement of the rack for a given rotation of the pinion shaft. A quick steering ratio refers to an increased displacement of the rack for a given rotation of the pinion shaft while a slow steering ratio refers to a decreased displacement of the rack for a given rotation of the pinion shaft. Consider a small turn of the steering wheel that causes a small rotation of the pinion shaft. The small rotation of the pinion shaft is magnified by the quick steering ratio and thereby causes a large displacement of the rack, which leads to a large turn of the front wheels. Conversely, the small rotation of the pinion shaft is reduced by the slow steering ratio and thereby causes a very small displacement of the rack, which leads to a very small turn of the front wheels. Hereafter for discussion purposes, a given rotation of the pinion shaft refers to a small rotation of the pinion shaft. This way a given rotation of the pinion shaft refers to a small rotation of the pinion shaft, which is reduced by a rack and pinion gearset with a slow steering ratio and thereby causes a very small displacement of the rack; i.e., a rack and pinion gearset with a slow steering ratio refers to a small rotation of the pinion shaft, which causes a very small displacement of the rack.

Since articulation of the axle when driving straight ahead refers to a simulated rotation of the pinion shaft, which causes an unintended displacement of the rack and since a rack and pinion gearset with a slow steering ratio refers to a small rotation of the pinion shaft, which causes a very small displacement of the rack, then by using a rack and pinion gearset with a slow steering ratio, the articulation of the axle when driving straight ahead refers to a small simulated rotation of the pinion shaft, which causes a very small unintended displacement of the rack. That is, by using a rack and pinion gearset with a slow steering ratio, the articulation of the axle when driving straight ahead causes a very small unintended displacement of the rack. Thus during articulation when driving straight ahead, as the steering ratio of the rack and pinion gearset slows down, the unintended displacement of the rack decreases. Since bumpsteer is the unintended turning of the front wheels, then by using a rack and pinion gearset with a slow steering ratio, the articulation of the axle when driving straight ahead causes a very small unintended displacement of the rack which leads to a very small unintended turn of the front wheels, and thereby very small bumpsteer. This way by using a rack and pinion gearset with a slow steering ratio, the articulation of the axle when driving straight ahead causes a very small unintended displacement of the rack, which leads to a very small unintended turn of the front wheels. The very small unintended turn of the front wheels defines very small bumpsteer—bumpsteer is negligible.

In conclusion: Any slow ratio rack and pinion gearset that is connected to a slip-joint equipped steering shaft can operate with zero bumpsteer during suspension travel and negligible bumpsteer during articulation. That is, the front axle-mounted slow ratio rack and pinion gearset invokes zero bumpsteer during suspension travel and negligible bumpsteer during articulation. Therefore, the manual rack and pinion gearset 24 and ram assist rack and pinion gearset 30 invoke zero bumpsteer during suspension travel and negligible bumpsteer during articulation; i.e., the manual rack and pinion gearset 24 and ram assist rack and pinion gearset 30 invoke zero bumpsteer during suspension travel and negligible articulation-induced bumpsteer.

Referring to FIGS. 1-5, there are various illustrations of the augmented chain and sprocket assembly 11. The augmented chain and sprocket assembly 11 is a gearbox constructed of light-weight material such as aluminum, plastic, plastic composite, or related material. The material is machined in a manner such that the housing has the oval-like shape of a stadium, the one rounded end being larger than the second rounded end. The housing comprises internal and external components. The internal components include a large sprocket 12, small sprocket 13, chain 14, input shaft 15, and output shaft 16. The input and output shafts 15 and 16 protrude through opposite sides of the housing, thereby the input and output shafts 15 and 16 define the external components. The input and output shafts 15 and 16 are machined with serrations, the serrations being like the teeth on a gear. The large sprocket 12 is adapted to the input shaft 15 while the small sprocket 13 is adapted to the output shaft 16, the combination of each sprocket and shaft acts as a single unit, and is rotationally affixed to the inside of the housing. The large sprocket 12 and input shaft 15 unit is located at the one rounded end of the housing while the small sprocket 13 and output shaft 16 unit is located at the second rounded end of the housing such that the teeth on the large sprocket 15 do not contact those on the small sprocket 16. The chain 14 is positioned around the large and small sprockets 12 and 13 such that the links on the chain 14 are able to contact the teeth on the large and small sprockets 12 and 13. The contact between the links on the chain 14 and teeth on the large and small sprockets 12 and 13 depicts a rotational interaction between the chain 14 and large and small sprockets 12 and 13. The rotational interaction is caused by the rotational torque from the steering input and thereby enables steering input to be transmitted internally from the large sprocket 12 and input shaft 15 unit to the small sprocket 13 and output shaft 16 unit; i.e., from the input shaft 15 to the output shaft 16.

The augmented chain and sprocket assembly 11 quickens steering input. The quickening property acts to multiply steering input, and the multiplication of steering input is called augmentation. The augmentation enables the augmented chain and sprocket assembly 11 to function as a steering quickener. In order to function as a steering quickener, the augmented chain and sprocket assembly 11 is constructed in a manner such that the diameter of the large sprocket 12 is greater than that of the small sprocket 13. The differing diameters of the large and small sprockets 12 and 13 indicate that for every one rotation of the input shaft 15, the output shaft 16 undergoes more than one rotation. In effect, the rotation of the steering wheel is multiplied such that the rotation of the pinion shaft is greater than that of the steering wheel. For every rotation of the steering wheel, rotation of the pinion shaft is multiplied by the amount of the augmentation.

Common augmentations include: 1.5:1 and 2:1. One revolution of the steering wheel is 360 degrees (360°). At 1.5:1, for every one revolution of the steering wheel, the pinion shaft rotates one and a half revolutions, or 540 degrees (540°). At 2:1, for every one revolution of the steering wheel, the pinion shaft rotates two revolutions, or 720 degrees (720°). Steering input is transmitted from the input shaft 15 to the output shaft 16 such that the rotation of the input shaft 15 causes the output shaft 16 to rotate. The greater rotation of the output shaft 16 relative to the input shaft 15 means that the rotational torque that is exerted on the input shaft 15 must be increased in order to cause the output shaft 16 to rotate—the driver must exert more "muscle" to turn the steering wheel. That is, augmentation of the augmented chain and sprocket assembly 11 makes rotation of the output shaft 16 by the input shaft 15 (or steering input) more difficult. The increase in rotational torque is proportional to the augmentation. As the diameter of the sprocket attached to the input shaft 15 increases relative to that attached to the output shaft 16, the rotational torque needed to rotate the output shaft 16 increases.

The internal components are able to include an electric motor 17. One end of the rotor 18 protrudes through the electric motor 17, and is connected to a cup-shaped gear 19 such that the teeth on the cup-shaped gear 19 point in the same direction as the rotor 18. The electric motor 17 is attached to the inside of the housing in a manner such that the rotor 18 is oriented adjacent to and perpendicular to the input or output shaft 15 or 16. Referring particularly to FIGS. 4 and 5, the adjacent perpendicular orientation enables the teeth on the cup-shaped gear 19 to mesh with the serrations on the input shaft 15 (meshing not shown) or output shaft 16 (meshing shown). The meshing between the teeth and serrations defines a rotational interaction between the electric motor 17 and output shaft 16. The electric motor 17 generates a rotational torque which defines a torque (rotational) force. The rotational interaction between the electric motor 17 and output shaft 16 enables the torque force to be exerted on the output shaft 16. The torque force multiplies the rotational torque from the steering input, thereby resulting in effortless rotation of the output shaft 16. The electric motor 17 is connected via 2-3 small wires to an electronic control module (wires and module not shown). The electronic control module responds to steering input by supplying power to and governing the direction and rotational speed of the electric motor 17. This way, the electric motor 17 facilitates rotation of the output shaft 16 at the same speed and direction as does steering input, thereby helping the front wheels to turn left or right. The electronic control module can be mounted to any convenient surface; e.g., firewall, dash panel, or inner fender well. The electric motor 17 is a brushless variant of the small, powerful electric motors manufactured by Vivax Assist®. Vivax Assist® motors are commonly built into the frames of bicycles and facilitate the turning of the petal crank by the rider. The brushless design is a state-of-the-art feature introduced to electric motors. While the design has not been incorporated into the Vivax Assist® motor, a brushless Vivax Assist® motor promises two qualities for the electric motor 17: One, it enables the electric motor 17 to exert variable torque force on the output shaft 16. The variability refers to the torque force being exerted in proportion to the rotational torque supplied by the driver turning the steering wheel. Two, the variability means that just the right amount of torque force is exerted on the output shaft 16 at any given time, and thereby improves the durability of the electric motor 17.

As a steering quickener, the augmented chain and sprocket assembly 11 quickens (speeds up) the steering input by the driver. The quickening (speeding up) of the steering input refers to the quickening (speeding up) of the rotation of the steering wheel, in effect, the multiplication of the rotation of the steering wheel. The multiplied rotation of the steering wheel is transmitted to all components downstream of the augmented chain and sprocket assembly 11, particularly the pinion shaft; meaning that the pinion shaft rotates at a faster rate than does the steering wheel.

The faster rotation of the pinion shaft causes the front wheels to turn faster than they do when steering input is not multiplied. The net effect of the front wheels turning faster with the augmented chain and sprocket assembly 11 than they do without the augmented chain and sprocket assembly 11 is that, in order to turn the front wheels a given amount, the driver turns the steering wheel less with the augmented chain and sprocket assembly 11 than they do without the augmented chain and sprocket assembly 11. That is, the multiplication of the rotation of the steering wheel has the effect of reducing the turns that the driver must do to the steering wheel in order to turn the front wheels a given amount—the quicker (faster) the steering input, the greater is the multiplication of the rotation of the steering wheel, and the less the driver must turn the steering wheel in order to turn the front wheels a given amount. For example, consider a steering system without the augmented chain and sprocket assembly 11 in which the driver must do a half turn of the steering wheel (180 degrees) in order to make the front wheels turn 10 degrees. Now include the augmented chain and sprocket assembly 11 with a 2:1 augmentation to the steering system. The 2:1 augmentation has the effect of doubling the rate of rotation of the steering wheel, which has the effect of cutting in half the amount that the driver needs to turn the steering wheel in order to make the front wheels turn 10 degrees. Thus, the half turn of the steering wheel (180 degrees) is cut in half to only a quarter turn of the steering wheel (90 degrees) in order to make the front wheels turn 10 degrees.

The turns that the driver does to the steering wheel in order to turn the front wheels a given amount define the vehicle's steering response. For a given turn of the front wheels, the less the driver turns the steering wheel, the quicker/faster the vehicle's steering response. Since turning the steering wheel can be a fatiguing process, a steering system is preferably designed in order to minimize the turning of the steering wheel by the driver. For example, sports cars and race cars are designed to have quick steering response in order to maximize performance and handling and minimize driver fatigue.

The augmented chain and sprocket assembly 11 has a direct effect on the steering ratios of the manual rack and pinion gearset 24 and ram assist rack and pinion gearset 30. The steering ratio defines the number of times the steering wheel must be turned in order to turn the front wheels from lock to lock. One turn of the steering wheel refers to one 360 degree rotation of the steering wheel; whereas turning from lock to lock refers to the front wheels being turned from a full left turn to a full right turn or vice versa. For example, a 3:1 steering ratio indicates that the steering wheel is turned three times in order to turn the front wheels from lock to lock; and, a 6:1 steering ratio indicates that the steering wheel is turned six times in order to turn the front wheels from lock to lock. The smaller the steering ratio, the less times the steering wheel is turned to make the front wheels turn from lock to lock, and the quicker (faster) is the vehicle's steering response.

The multiplied rotation of the steering wheel, which is transmitted to the pinion shaft, acts to multiply the rotation of the pinion shaft. The multiplied rotation of the pinion shaft increases the displacement of the rack during the meshing process. The increased displacement of the rack leads to a quicker (faster) turn of the front wheels, which has the effect of quickening (speeding up) the steering ratio of the manual rack and pinion gearset 24 or ram assist rack and pinion gearset 30. For example: First consider that the manual rack and pinion gearset 24 or ram assist rack and pinion gearset 30 has a 6:1 steering ratio such that the driver must do six turns of the steering wheel (6×360 degrees) in order to make the front wheels turn from lock to lock. Second, now include the augmented chain and sprocket assembly 11 with a 2:1 augmentation to the manual rack and pinion gearset 24 or ram assist rack and pinion gearset 30. The 2:1 augmentation has the effect of doubling the rate of rotation of the pinion shaft which doubles the displacement of the rack.

The doubling of the displacement of the rack doubles the speed at which the front wheels turn from lock to lock. The doubling of the speed at which the front wheels turn from lock to lock cuts in half the required number of turns of the steering wheel in order to make the front wheels turn from lock to lock. Thus, the six turns of the steering wheel (6×360 degrees) is cut in half to only three turns of the steering wheel (3×360 degrees) in order to make the front wheels turn from lock to lock. The reduction of the six turns to three turns effectively transforms the 6:1 steering ratio into a 3:1 steering ratio, i.e., the manual rack and pinion gearset 24 or ram assist rack and pinion gearset 30, with a 6:1 steering ratio operates as though it has a 3:1 steering ratio.

Conclusion: When combined with the 2:1 augmented chain and sprocket assembly 11, the 6:1 steering ratio manual rack and pinion gearset 24 or ram assist rack and pinion gearset 30 operates as though it has a 3:1 steering ratio. For discussion purposes, let the 6:1 steering ratio refer to a slow steering ratio while a 3:1 steering ratio refers to a quick steering ratio: The inclusion of the 2:1 augmented chain and sprocket assembly 11 into a steering system comprised of the 6:1 steering ratio manual rack and pinion gearset 24 or ram assist rack and pinion gearset 30 transforms a slow steering system into a quick steering system, thereby quickening (speeding up) the vehicle's steering response. In other words: The combination of the augmentation and slow steering ratio causes a quick turn of the front wheels for a given rotation of the steering wheel, and defines quick steering response; the quick steering response being analogous to an ordinary steering system comprised of a quick ratio rack and pinion gearset. The net result of the combined augmentation and slow steering ratio is quick steering response with zero bumpsteer during suspension travel and negligible bumpsteer during articulation, i.e., negligible articulation-induced bumpsteer.

Referring to FIGS. 6-11, there are shown a method for computing articulation-induced bumpsteer as a function of the steering ratio of the rack and pinion gearset. The relationship between bumpsteer and steering ratio during articulation is based on ten assumptions. The ten assumptions lead to the derivation of four mathematical equations. The four mathematical equations define an algorithm. The algorithm computes bumpsteer for a selected steering ratio. For discussion purposes, two different steering ratios, 3:1 and 6:1, are selected. Bumpsteer for the steering ratio of 3:1 is computed with a first algorithm while bumpsteer for the steering ratio of 6:1 is computed with a second algorithm. The ten assumptions are described below, followed by the first and second algorithms, each algorithm referring to the same four mathematical equations. Key terms and interrelationships among the ten assumptions are shown in the FIGS. 6-9 while the bumpsteers for the steering ratios of 3:1 and 6:1 are shown in FIGS. 10 and 11, respectively.

Ten Assumptions

1. The turning of the front wheels refers to the front wheels rotating about a vertical axis that passes through the middle of wheel, and is reported in degrees of rotation about the vertical axis. This way, centered front wheels refer to zero degrees (0°). A full left or right turn of the front wheels refers to the front wheels being turned from center to lock, and refers to 35 degrees (35°). Referring to FIG. 6: one of the front wheels is specified by A1; centered front wheels are specified by A3; and, a full left turn, full right turn of the front wheels are specified by A4, A5, respectively.
2. One full turn of the steering wheel refers to one full rotation of the pinion shaft or front axle about the longitudinal axis. One full turn or rotation refers to a 360 degree (360°) turn or rotation, respectively.
3. A centered steering wheel refers to centered front wheels such that the vehicle is traveling straight ahead.
4. The turning of the steering wheel from center to lock refers to the turn of the front wheels from center to lock.
5. The steering ratio refers to the number of turns of the steering wheel or number of rotations of the pinion shaft in order for the front wheels to go from a full left turn to a full right turn, or vice versa; i.e., to go from lock-to-lock.
6. A steering ratio of 3:1 defines the steering wheel being turned 3 times or 3 full turns in order for the front wheels to go from lock to lock, which also refers to the steering wheel being turned 1.5 times or 1.5 full turns in order for the front wheels to go from center to lock, i.e., a full left turn or a full right turn. A steering ratio of 3:1 is a quick steering ratio. Referring to FIG. 6: a steering ratio of 3:1 is specified by A6, which indicates that the steering wheel is turned 1.5 times in order for the front wheels to undergo a full left turn or a full right turn.
7. A steering ratio of 6:1 defines the steering wheel being turned 6 times or 6 full turns in order for the front wheels to go from lock to lock, which also refers to the steering wheel being turned 3 times or 3 full turns in order for the front wheels to go from center to lock, i.e., a full left turn or a full right turn. A steering ratio of 6:1 is a slow steering ratio. Referring to FIG. 6: a steering ratio of 6:1 is specified by A7, which indicates that the steering wheel is turned 3 times in order for the front wheels to undergo a full left turn or a full right turn.
8. Referring to FIG. 7, a front axle is shown and includes a rack and pinion gearset A8 with a pinion shaft A9, differential housing A10 with a front drive shaft A11, driver side inner-C end forging A12, and passenger side inner-C end forging A13.
9. Articulation refers to rotation of the front axle about the longitudinal axis, and is reported in degrees of rotation about the longitudinal axis. For reference, articulation is 0° when the axle is parallel to the ground; referring to FIGS. 7-9, the ground is specified by A2. Maximum articulation during off-road driving is 40 degrees (40°) while maximum articulation during street driving is 20 degrees (20°). Referring to FIGS. 7, 8, and 9, the front axle is parallel to the ground, articulated 20°, and articulated 40°, respectively.
10. Articulation, i.e. rotation of the front axle about the longitudinal axis, causes rotation of the rack and pinion gearset and refers to the simulated rotation of the pinion shaft. The rotation of the front axle about the longitudinal axis or simulated rotation of the pinion shaft is reported in degrees. Referring to FIG. 8 or 9, the thick curved arrow around the pinion shaft indicates that the pinion shaft is undergoing a simulated rotation of 20° or 40°, respectively.

First, Second Algorithms (1) Assumed Terms
  a. steering ratio=3:1, 6:1
  b. maximum turn of front wheels from center to lock=35°
  c. maximum off-road articulation=40°
  d. maximum street articulation=20°
  e. rotation of pinion shaft per one full turn of steering wheel=360°
  f. simulated rotation of pinion shaft at maximum off-road articulation=40°
  g. simulated rotation of pinion shaft at maximum street articulation=20°

1. Equation 1 computes the number of turns of the steering wheel for front wheels to go from center to lock for a given steering ratio. The computation involves dividing the first number in the steering ratio by two. Turns of steering wheel from center to lock is specified as Aα in the drawings.

$$\text{turns of steering wheel from center to lock} = \text{first number in steering ratio} \div 2 \qquad (\text{eq-1})$$

2. Equation 2 computes the rotation of the pinion shaft for front wheels to go from center to lock for a given steering ratio. The computation involves multiplying the number of turns of the steering wheel for front wheels to go from center to lock by a conversion factor comprising the rotation of the pinion shaft per one full turn of the steering wheel. Rotation of pinion shaft from center to lock is specified as Bβ in the drawings.

$$\text{rotation of pinion shaft from center to lock} = \text{turns of steering wheel from center to lock} \cdot \left[ \text{Rotation of pinion shaft} \div \text{one full turn of steering wheel} \right] \qquad (\text{eq-2})$$

3. Equation 3 computes the bumpsteer during maximum off-road articulation. The computation involves multiplying the simulated rotation of the pinion shaft during maximum off-road articulation by a conversion factor comprising the turn of the front wheels from center to lock per the rotation of the pinion shaft for front wheels to go from center to lock. Bumpsteer at maximum off-road articulation is specified as Γγ in the drawings.

$$\text{bumpsteer at maximum off-road articulation} = \text{simulated rotation of pinion shaft at maximum off-road articulation} \cdot \qquad (\text{eq-3})$$

-continued $$= \frac{\begin{bmatrix} \text{turn of front wheels} \\ \text{from center to lock} \end{bmatrix} \div \begin{bmatrix} \text{rotation of pinion} \\ \text{shaft from} \\ \text{center to lock} \end{bmatrix}}{\text{unintended turns of front wheels at maximum off-road articulation}}$$

4. Equation 4 computes the bumpsteer during maximum street articulation. The computation involves multiplying the simulated rotation of the pinion shaft during maximum street articulation by a conversion factor comprising the turn of the front wheels from center to lock per the rotation of the pinion shaft for front wheels to go from center to lock. Bumpsteer at maximum street articulation is specified as Δδ in the drawings.

$$\begin{matrix} \text{bumpsteer at} \\ \text{maximum} \\ \text{street} \\ \text{articulation} \end{matrix} = \frac{\begin{matrix} \text{simulated rotation of pinion} \\ \text{shaft at maximum street} \\ \text{articulation} \end{matrix} \cdot \begin{bmatrix} \text{turn of front wheels} \\ \text{from center to lock} \end{bmatrix} \div \begin{bmatrix} \text{rotation of pinion} \\ \text{shaft from} \\ \text{center to lock} \end{bmatrix}}{\text{unintended turns of front wheels at maximum street articulation}} \quad (\text{eq-4})$$

FIG. 10 illustrates the computation of bumpsteer when the steering ratio is 3:1 while FIG. 11 illustrates the computation of bumpsteer when the steering ratio is 6:1. Comparison of the results shown in FIGS. 10, 11 clearly reveal two conclusions: One, bumpsteer due to the quick steering ratio is greater than that due to the slow steering ratio, thereby indicating that bumpsteer is related to the "quickness" of the steering ratio—the quicker the steering ratio, the greater the bumpsteer. Two, bumpsteer due to off-road articulation is greater than that due to street articulation, thereby indicating that bumpsteer is related to the articulation of the front axle—the greater the articulation, the greater the bumpsteer.

The steering ratio of 6:1 is a slow steering ratio and results in a bumpsteer of 0.7 degrees (0.7°) for maximum articulation during street driving; i.e., a slow steering ratio results in a maximum articulation-induced bumpsteer of 0.7° when driving on the street. For discussion purposes: a bumpsteer of 0.7° is very small and defines negligible bumpsteer; maximum articulation during street driving is simply called articulation during street driving; and ordinary driving conditions refer to street or mild off-road driving. This way, a slow steering ratio results in a maximum articulation-induced bumpsteer of 0.7° during ordinary driving conditions. Maximum articulation during street driving refers to articulation of the axle while maximum articulation during off-road driving refers to large articulation of the axle. A slow steering ratio results in negligible articulation-induced bumpsteer (max of 0.7°) during ordinary driving conditions.

Referring to FIG. 12, there is shown equation 5 for computing the augmentation of the augmented chain and sprocket assembly 11. Augmentation of the augmented chain and sprocket assembly 11 can be determined from a simple computation involving the current steering ratio and the desired steering ratio. Given that the current steering ratio is different, and likely slower, than the desired steering ratio, then the augmentation of the augmented chain and sprocket assembly 11 is computed as the quotient found by dividing the first number in the current steering ratio by the first number in the desired steering ratio. For example, given that the current steering ratio is 6:1 while the desired steering ratio is 3:1, then the augmentation of the augmented chain and sprocket assembly 11 is 2:1 (6/3), meaning that for every one rotation of the input shaft 15, the output shaft 16 undergoes two rotations. Augmentation of chain and sprocket assembly is specified as Eε in the drawings.

$$\begin{matrix} \text{Augmentation of chain} \\ \text{and sprocket assembly} \end{matrix} = \frac{\text{current steering}}{\text{ratio}} \div \frac{\text{desired steering}}{\text{ratio}} \quad (\text{eq-5})$$

Referring to FIG. 13, there is an illustration of the first particular arrangement of the steering system. The steering system includes the manual rack and pinion gearset 24, augmented chain and sprocket assembly 11, electric assist motor box 22, and associated linkages. The linkages include a coupler shaft 21, steering shaft 23, draglink 25, and tie rod 27. Secured to the firewall 10 is the augmented chain and sprocket assembly 11, the augmented chain and sprocket assembly 11 being vertically oriented such that the one rounded end is at the top while the second rounded end is at the bottom. The input shaft 15 is directed backward towards the steering wheel and is pivotally connected to the end of the steering column (not shown) while the output shaft 16 is directed forward towards the front axle 20 and is pivotally connected to the back end of the coupler shaft 21. The front end of the coupler shaft 21 is pivotally connected to the input shaft of the electric assist motor box 22. The output shaft of the electric assist motor box 22 is pivotally connected to the back end of the steering shaft 23 while the front end of the steering shaft 23 is pivotally connected to the pinion shaft of the manual rack and pinion gearset 24.

Cooperation among the augmented chain and sprocket assembly 11, coupler shaft 21, electric assist motor box 22, and steering shaft 23 enables steering input to be transmitted from the steering column to the manual rack and pinion gearset 24. The manual rack and pinion gearset 24 is attached to the front axle 20 between the differential housing and driver side inner-C end forging. The end of the rack is pivotally connected to the first end of the draglink 25 while the second end of the draglink 25 is pivotally connected to the passenger-side steering knuckle 26. The passenger-side steering knuckle 26 is pivotally connected to the first end of the tie rod 27 while the second end of the tie rod 27 is pivotally connected to the driver-side steering knuckle 28. Cooperation among the manual rack and pinion gearset 24, draglink 25, and tie rod 27 enables steering input to be transmitted from the manual rack and pinion gearset 24 to the driver-side and passenger-side steering knuckles 28 and 26. Transmission of steering input to the driver-side and passenger-side steering knuckles 28 and 26 enable the driver-side and passenger-side steering knuckles 28 and 26 to turn, and thereby turn the vehicle.

The electric assist motor box 22 is attached to the inner part of the driver frame side rather than to the manual rack and pinion gearset 24. Attachment to the inner part of the driver frame side defines a remote location that removes the electric power assist motor box 22 from the manual rack and pinion gearset 24, and isolates the electric assist motor box 22 from the adverse conditions experienced by the manual rack and pinion gearset 24. The isolation maintains the precise electric power assist function during operation of the vehicle over rough terrain. The electric assist motor box 22 multiplies the rotational torque of the pinion shaft. The multiplied rotational torque of the pinion shaft defines a multiplied pinion shaft force. The multiplied pinion shaft force is exerted on the rack, and thereby results in effortless displacement of the rack. The torque force from the electric motor 17 that is exerted on the output shaft 16 results in effortless rotation of the output shaft 16.

The combined effects of the effortless rotation of the output shaft 16 and effortless displacement of the rack lead to effortless turning of the front wheels by the steering system comprising the manual rack and pinion gearset 24, augmented chain and sprocket assembly 11, electric assist motor box 22. The effortless turning of the front wheels by the steering system comprising the manual rack and pinion gearset 24, augmented chain and sprocket assembly 11, electric assist motor box 22 is similar to that by a steering system comprising a hydraulic assist rack and pinion gearset.

The steering quickener effect of the augmented chain and sprocket assembly 11 quickens the slow ratio of the manual rack and pinion gearset 24 such that the cooperation between the augmented chain and sprocket assembly 11 and manual rack and pinion gearset 24 provides the steering system with quick steering response, the same quick steering response provided by a steering system with a quick ratio manual rack and pinion gearset.

Given that a slow steering ratio results in negligible articulation-induced bumpsteer (max of) 0.7° during ordinary driving conditions (street or mild off-road driving conditions), then the use of the slow ratio manual rack and pinion gearset 24 results in negligible articulation-induced bumpsteer (max of 0.7°) during ordinary driving conditions (street or mild off-road driving conditions). Also, the manual rack and pinion gearset 24 invokes zero bumpsteer during suspension travel.

This way during ordinary driving conditions, the combined effects of the steering quickener augmented chain and sprocket assembly 11 and slow ratio manual rack and pinion gearset 24 results in a steering system with quick steering response with negligible if any bumpsteer during all phases of operation by the front suspension system.

Conclusion: during ordinary driving conditions, the combined effects of the multiplied force capabilities of the electric motor 17 and electric assist motor box 22, steering quickener augmented chain and sprocket assembly 11, and slow ratio manual rack and pinion gearset 24 result in a steering system comprising effortless and quick steering response with negligible if any bumpsteer during all phases of operation by the front suspension system.

Referring to FIG. 14, there is an illustration of the second particular arrangement of the steering system. The steering system includes the ram assist rack and pinion gearset 30, augmented chain and sprocket assembly 11, and associated linkages. The linkages include a coupler shaft 21, steering shaft 23, draglink 25, and tie rod 27. Components of the ram assist rack and pinion gearset 30 include the rack 32, control valve 29, and tie rod bar 31. Secured to the firewall 10 is the augmented chain and sprocket assembly 11, the augmented chain and sprocket assembly 11 being vertically oriented such that the one rounded end is at the top while the second rounded end is at the bottom. The input shaft 15 is directed backward towards the steering wheel and is pivotally connected to the end of the steering column while the output shaft 16 is directed forward towards the front axle 20 and is pivotally connected to the back end of the coupler shaft 21. The front end of the coupler shaft 21 is pivotally connected to the input shaft of the control valve 29. The output shaft of the control valve 29 is pivotally connected to the back end of the steering shaft 23 while the front end of the steering shaft 23 is pivotally connected to the pinion shaft of the ram assist rack and pinion gearset 30.

Cooperation among the augmented chain and sprocket assembly 11, coupler shaft 21, control valve 29, and steering shaft 23 enables steering input to be transmitted from the steering column to the ram assist rack and pinion gearset 30. The ram assist rack and pinion gearset 30 is attached to the front axle 20 between the differential housing and driver side inner-C end forging. The first and second ends of the ram are secured to the one and other ends of the tie rod bar 31, and to the driver and passenger ends of the rack 32, respectively. The mid-point of the tie rod bar 31 is pivotally connected to the first end of the draglink 25 while the second end of the draglink 25 is pivotally connected to the passenger-side steering knuckle 26. The passenger-side steering knuckle 26 is pivotally connected to the first end of the tie rod 27 while the second end of the tie rod 27 is pivotally connected to the driver-side steering knuckle 28. Cooperation among the ram assist rack and pinion gearset 30, draglink 25, and tie rod 27 enables steering input to be transmitted from the ram assist rack and pinion gearset 30 to the driver-side and passenger-side steering knuckles 28 and 26. Transmission of steering input to the driver-side and passenger-side steering knuckles 28 and 26 enable the driver-side and passenger-side steering knuckles 28 and 26 to turn, and thereby turn the vehicle.

The control valve 29 is attached to the inner part of the driver frame side rather than to the ram assist rack and pinion gearset 30. Attachment to the inner part of the driver frame side defines a remote location that removes the hydraulic fluid regulating function of the control valve 29 from the ram assist rack and pinion gearset 30, and isolates the control valve 29 from the adverse conditions experienced by the ram assist rack and pinion gearset 30. The isolation maintains the precise hydraulic fluid regulating function of the control valve 29 during operation of the vehicle over rough terrain. The remote location effectively converts the ram assist rack and pinion gearset 30 into a simple mechanical device that defines a mechanically actuated analog of the full hydraulic steering ram commonly used on front solid axle four wheel drive vehicles.

The ram is activated by hydraulic fluid. Hydraulic fluid flows between the control valve 29 and ram through lines constructed of rigid metal tubing 33 and flexible rubber tubing 34. The control valve 29 regulates the flow of the hydraulic fluid to the ram. The hydraulic fluid generates hydraulic pressure in the ram which defines a hydraulic pressure force of the ram. The hydraulic pressure force is coordinated with the pinion shaft force. Coordination between the hydraulic pressure force and pinion shaft force defines a combined hydraulic pressure force and pinion shaft force, the combined hydraulic pressure force and pinion shaft force referring to a multiplied force. The multiplied force is exerted on the tie rod bar 31, and thereby results in the effortless displacement of the tie rod bar 31. The torque force from the electric motor 17 that is exerted on the output shaft 16 results in effortless rotation of the output shaft 16.

The combined effects of the effortless rotation of the output shaft 16 and effortless displacement of the tie rod bar 31 lead to effortless turning of the front wheels by the steering system comprising the augmented chain and sprocket assembly 11 and ram assist rack and pinion gearset 30. The effortless turning of the front wheels by the steering system comprising the augmented chain and sprocket assembly 11 and ram assist rack and pinion gearset 30 is similar to that by a steering system comprising a hydraulic assist rack and pinion gearset.

The steering quickener effect of the augmented chain and sprocket assembly 11 quickens the slow ratio of the ram assist rack and pinion gearset 30 such that the cooperation between the augmented chain and sprocket assembly 11 and ram assisted rack and pinion gearset 30 provides the steering system with quick steering response, the same quick steering response provided by a steering system with a quick ratio hydraulic assist rack and pinion gearset.

Given that a slow steering ratio results in negligible articulation-induced bumpsteer (max of) 0.7° during ordinary driving conditions (street or mild off-road driving conditions), then the use of the slow ratio ram assist rack and pinion gearset 30 results in negligible articulation-induced bumpsteer (max of 0.7°) during ordinary driving conditions (street or mild off-road driving conditions). Also, the ram assist rack and pinion gearset 30 invokes zero bumpsteer during suspension travel.

This way during ordinary driving conditions, the combined effects of the steering quickener augmented chain and sprocket assembly 11 and slow ratio ram assist rack and pinion gearset 30 results in a steering system with quick steering response with negligible if any bumpsteer during all phases of operation by the front suspension system.

Conclusion: during ordinary driving conditions, the combined effects of the multiplied force capabilities of the electric motor 17 and hydraulic ram, steering quickener augmented chain and sprocket assembly 11, and slow ratio ram assist rack and pinion gearset 30 result in a steering system comprising effortless and quick steering response with negligible if any bumpsteer during all phases of operation by the front suspension system.

While the invention has been illustrated and described as embodied in a vehicle steering system, it is not intended to be limited to the details shown, since it will be understood that various omissions, modifications, substitutions and changes in the forms and details of the device illustrated and in its operation can be made by those skilled on the art without departing in any way from the scope and spirit of the present invention.

What is claimed is:

1. A steering system for a vehicle having a frame with respective frame sides and suspended above solid front and rear axles, the steering system comprising:
    a rack and pinion gearset configured with a slow steering ratio;
    an augmented chain and sprocket assembly comprising
        an augmented chain and sprocket assembly housing,
        a large sprocket having teeth and housed within the augmented chain and sprocket housing,
        a small sprocket having teeth and housed within the augmented chain and sprocket housing,
        a chain having chain links rotationally coupling the large sprocket and small sprocket, wherein the chain is housed within the augmented chain and sprocket housing,
        an input shaft having serrations and adapted to the large sprocket, wherein the input shaft is partially housed within the augmented chain and sprocket housing,
        an output shaft having serrations and adapted to the small sprocket, wherein the output shaft is partially housed within the augmented chain and sprocket housing, and
        an electric motor having a rotor and a cup-shaped gear with teeth and housed within the augmented chain and sprocket housing,
        wherein the input shaft and output shaft protrude through opposite sides of the augmented chain and sprocket housing;
    a coupler shaft having a front and back ends,
        wherein the front end of the coupler shaft is connected to an electric assist motor box, and said back end is connected to the augmented chain and sprocket assembly housing;
    a steering shaft having a front and back ends,
        wherein the back end of the steering shaft is connected to an output shaft of the electric motor assist box, and the front end of the steering shaft is connected to the rack and pinion gearset;
    a draglink having a first and second end, the second end connected to a passenger-side steering knuckle; a tie rod having a first and second end, the first end is pivotally connected to the passenger-side steering knuckle while the second end is pivotally connected to a driver-side steering knuckle; and
    wherein a turning of a steering wheel by a driver defines steering input, the steering input refers to a rotational torque, the steering input is transmitted from the steering wheel through the steering system to a front wheels thereby causing the front wheels to turn.

2. The steering system of claim 1, wherein the augmented chain and sprocket assembly housing has an oval-like shape of a stadium with two rounded ends, a first rounded end of two rounded ends being larger than a second rounded end of the two rounded ends;
    wherein the large sprocket is adapted to the input shaft white the small sprocket is adapted to the output shaft, the combination of the large sprocket, the small sprocket, the input shaft and the output shaft acts as a single unit, and is rotationally affixed to the inside of the augmented chain and sprocket assembly housing, the large sprocket and input shaft unit is located at the first rounded end of the augmented chain and sprocket assembly housing while the small sprocket and output shaft unit is located at the second rounded end of the augmented chain and sprocket assembly housing such that the teeth on the large sprocket do not contact those on the small sprocket, the chain is positioned around the large sprocket and the small sprocket such that the links on the chain are able to contact the teeth on the large sprocket and the small sprocket, the contact between the links on the chain and the teeth on the large sprocket and the small sprocket depicts a rotational interaction between the chain and large sprocket and small sprocket, the rotational interaction is caused by the rotational torque from the steering input and thereby enables steering input to be transmitted internally from the large sprocket and input shaft unit to the small sprocket and output shaft unit;
    wherein the electric motor is attached to the inside of the augmented chain and sprocket assembly housing in a manner such that the rotor of the electric motor is oriented adjacent to and perpendicular to an orientation of the output shaft of the augmented chain and sprocket assembly, the adjacent perpendicular orientation enables the teeth on the cup-shaped gear to mesh with the serrations on the output shaft, the meshing between the teeth and serrations defines a rotational interaction between the electric motor and output shaft, the electric motor generates a torque force such that the rotational interaction between the electric motor and output shaft enables the torque force to be exerted on the output shaft, the torque force multiplies the rotational torque from the steering input thereby facilitating the rotation of the output shaft.

3. The steering system of claim 2, wherein the rack and pinion gearset is a manual rack and pinion gearset; wherein secured to a firewall is the augmented chain and sprocket assembly, the augmented chain and sprocket assembly is vertically oriented such that the first rounded end is at a top while the second rounded end is at a bottom, the input shaft of the augmented chain and sprocket assembly is directed backward towards the steering wheel and is pivotally connected to an end of a steering column while the output shaft of the augmented chain and sprocket assembly is directed forward towards the front axle and is pivotally connected to the back end of the coupler shaft, the front end of the coupler shaft is pivotally connected to an input shaft of an electric assist motor box while an output shaft of the electric assist motor box is pivotally connected to the back end of the steering shaft, and the front end of the steering shaft is pivotally connected to a pinion shaft of the manual rack and pinion gearset;
    wherein cooperation among the augmented chain and sprocket assembly, coupler shaft, electric assist motor box, and steering shaft enables steering input to be transmitted from the steering column to the manual rack and pinion gearset;
    wherein the manual rack and pinion gearset is attached to the front axle between a differential housing and a driver side inner-C end forging, a rack of the manual rack and pinion gearset is pivotally connected to the first end of the draglink while the second end of the draglink is pivotally connected to the passenger-side steering knuckle, the passenger-side steering knuckle is pivotally connected to the first end of the tie rod while the second end of the tie rod is pivotally connected to the driver-side steering knuckle;
    wherein cooperation among the manual rack and pinion gearset, draglink, and tie rod enables steering input to be transmitted from the manual rack and pinion gearset to the driver-side and passenger-side steering knuckles, transmission of steering input to the driver-side and passenger-side steering knuckles enables the driver-side and passenger-side steering knuckles to turn, and thereby turn the vehicle.

4. The steering system of claim 2, wherein the rack and pinion gearset is a ram assist rack and pinion gearset;
    wherein secured to a firewall is the augmented chain and sprocket assembly, the assembly is vertically oriented such that the first rounded end is at the top while the second rounded end is at the bottom, the input shaft of the augmented chain and sprocket assembly is directed backward towards the steering wheel and is pivotally connected to an end of a steering column that is opposite the steering wheel, while the output shaft of the augmented chain and sprocket assembly is directed forward towards the front axle and is pivotally connected to the back end of the coupler shaft, the front end of the coupler shaft is pivotally connected to an input shaft of a control valve while an output shaft of the control valve is pivotally connected to the back end of the steering shaft, and the front end of the steering shaft is pivotally connected to a pinion shaft of the ram assist rack and pinion gearset;
    wherein cooperation among the augmented chain and sprocket assembly, coupler shaft, control valve, and steering shaft enables steering input to be transmitted from the steering column to the ram assist rack and pinion gearset;
    wherein the ram assist rack and pinion gearset is attached to the front axle between a differential housing and a driver side inner-C end forging;
    wherein a first end and a second end of a ram of the ram assist rack and pinion gearset are connected to a driver-side end and a passenger-side end of a rack of the ram assist rack and pinion gearset, and to a first end and a second end of a tie rod bar of the ram assist rack and pinion gearset, the mid-point of the tie rod bar is pivotally connected to the first end of the draglink while the second end of the draglink is pivotally connected to the passenger-side steering knuckle, the passenger-side steering knuckle is pivotally connected to the first end of the tie rod while the second end of the tie rod is pivotally connected to the driver-side steering knuckle;
    wherein cooperation among the ram assist rack and pinion gearset, draglink, and tie rod enables steering input to be transmitted from the ram assist rack and pinion gearset to the driver-side and passenger-side steering knuckles, transmission of steering input to the driver-side and passenger-side steering knuckles enables the driver-side and passenger-side steering knuckles to turn, and thereby turn the vehicle.

5. The steering system of claim 1, wherein the augmented chain and sprocket assembly housing has an oval-like shape of a stadium with two rounded ends, a first rounded end of the two rounded ends being larger than a second rounded end of the two rounded ends;
    wherein the large sprocket is adapted to the input shaft while the small sprocket is adapted to the output shaft, the combination of the large sprocket, the small sprocket, the input shaft and the output shaft acts as a single unit, and is rotationally affixed to the inside of the augmented chain and sprocket assembly housing, the large sprocket and input shaft unit is located at the first rounded end of the augmented chain and sprocket assembly housing while the small sprocket and output shaft unit is located at the second rounded end of the augmented chain and sprocket assembly housing such that the teeth on the large sprocket do not contact those on the small sprocket, the chain is positioned around the large sprocket and the small sprockets such that the links on the chain are able to contact the teeth on the large sprocket and the small sprocket, the contact between the links on the chain and the teeth on the large sprocket and the small sprocket depicts a rotational interaction between the chain and large sprocket and small sprocket, the rotational interaction is caused by the rotational torque from the steering input and thereby enables steering input to be transmitted internally from the large sprocket and input shaft unit to the small sprocket and output shaft unit;
    wherein the electric motor is attached to the inside of the augmented chain and sprocket assembly housing in a manner such that the rotor of the electric motor is oriented adjacent to and perpendicular to an orientation of the input shaft of the augmented chain and sprocket assembly, the adjacent perpendicular orientation enables the teeth on the cup-shaped gear to mesh with the serrations on the input shaft, the meshing between the teeth and serrations defines a rotational interaction between the electric motor and input shaft, the electric motor generates a torque force such that the rotational interaction between the electric motor and input shaft enables the torque force to be exerted on the input shaft, the torque force multiplies the rotational torque from the steering input thereby facilitating the rotation of the output shaft.

6. The steering system of claim 5, wherein the rack and pinion gearset is a manual rack and pinion gearset; wherein secured to a firewall is the augmented chain and sprocket assembly, the augmented chain and sprocket assembly is vertically oriented such that the first rounded end is at a top while the second rounded end is at a bottom, the input shaft of the augmented chain and sprocket assembly is directed backward towards the steering wheel and is pivotally connected to an end of a steering column while the output shaft of the augmented chain and sprocket assembly is directed forward towards the front axle and is pivotally connected to the back end of the coupler shaft, the front end of the coupler shaft is pivotally connected to an input shaft of an electric assist motor box while an output shaft of the electric assist motor box is pivotally connected to the back end of the steering shaft, and the front end of the steering shaft is pivotally connected to a pinion shaft of the manual rack and pinion gearset;

wherein cooperation among the augmented chain and sprocket assembly, coupler shaft, electric assist motor box, and steering shaft enables steering input to be transmitted from the steering column to the manual rack and pinion gearset;

wherein the manual rack and pinion gearset is attached to the front axle between a differential housing and a driver side inner-C end forging, a rack of the manual rack and pinion gearset is pivotally connected to the first end of the draglink while the second end of the draglink is pivotally connected to the passenger-side steering knuckle, the passenger-side steering knuckle is pivotally connected to the first end of the tie rod while the second end of the tie rod is pivotally connected to the driver-side steering knuckle;

wherein cooperation among the manual rack and pinion gearset, draglink, and tie rod enables steering input to be transmitted from the manual rack and pinion gearset to the driver-side and passenger-side steering knuckles, transmission of steering input to the driver-side and passenger-side steering knuckles enables the driver-side and passenger-side steering knuckles to turn, and thereby turn the vehicle.

7. The steering system of claim 5, wherein the rack and pinion gearset is a ram assist rack and pinion gearset;

wherein secured to a firewall is the augmented chain and sprocket assembly, the assembly is vertically oriented such that the first rounded end is at the top while the second rounded end is at the bottom, the input shaft of the augmented chain and sprocket assembly is directed backward towards the steering wheel and is pivotally connected to an end of a steering column that is opposite of the steering wheel, while the output shaft of the augmented chain and sprocket assembly is directed forward towards the front axle and is pivotally connected to the back end of the coupler shaft, the front end of the coupler shaft is pivotally connected to an input shaft of a control valve while an output shaft of the control valve is pivotally connected to the back end of the steering shaft, and the front end of the steering shaft is pivotally connected to a pinion shaft of the ram assist rack and pinion gearset;

wherein cooperation among the augmented chain and sprocket assembly, coupler shaft, control valve, and steering shaft enables steering input to be transmitted from the steering column to the ram assist rack and pinion gearset;

wherein the ram assist rack and pinion gearset is attached to the front axle between a differential housing and a driver side inner-C end forging;

wherein a first end and a second end of a ram of the ram assist rack and pinion gearset are connected to a driver-side end and a passenger-side end of a rack of the ram assist rack and pinion gearset, and to a first end and a second end of a tie rod bar of the ram assist rack and pinion gearset, the mid-point of the tie rod bar is pivotally connected to the first end of the draglink while the second end of the draglink is pivotally connected to the passenger-side steering knuckle, the passenger-side steering knuckle is pivotally connected to the first end of the tie rod while the second end of the tie rod is pivotally connected to the driver-side steering knuckle;

wherein cooperation among the ram assist rack and pinion gearset, draglink, and tie rod enables steering input to be transmitted from the ram assist rack and pinion gearset to the driver-side and passenger-side steering knuckles, transmission of steering input to the driver-side and passenger-side steering knuckles enables the driver-side and passenger-side steering knuckles to turn, and thereby turn the vehicle.

8. A steering system for a vehicle having a frame with respective frame sides and suspended above solid front and rear axles, the steering system comprising:

a rack and pinion gearset configured with a slow steering ratio;

an augmented chain and sprocket assembly comprising
an augmented chain and sprocket assembly housing,
a large sprocket having teeth and housed within the augmented chain and sprocket housing,
a small sprocket having teeth and housed within the augmented chain and sprocket housing,
a chain having chain links rotationally coupling the large sprocket and small sprocket, wherein the chain is housed within the augmented chain and sprocket housing,
an input shaft having serrations and adapted to the large sprocket, wherein the input shaft is partially housed within the augmented chain and sprocket housing,
an output shaft having serrations and adapted to the small sprocket, wherein the output shaft is partially housed within the augmented chain and sprocket housing, and
an electric motor having a rotor and a cup-shaped gear with teeth and housed within the augmented chain and sprocket housing, and
wherein the input shaft and output shaft protrude through opposite sides of the augmented chain and sprocket housing;

a coupler shaft having a front and back end, wherein the front end of the coupler shaft is connected to an electric assist motor box, and said back end is connected to the augmented chain and sprocket assembly housing; a steering shaft having a front and back end, wherein the back end of the steering shaft is connected to an output shaft of the electric motor assist box, and the front end of the steering shaft is connected to the rack and pinion gearset; a draglink having a first and second end, the second end connected to a passenger-side steering knuckle; a tie rod having a first and second end, the first end is pivotally connected to the passenger-side steering knuckle while the second end is pivotally connected to a driver-side steering knuckle; and wherein a turning of a steering wheel by a driver defines a steering input, the steering input refers to a rotational torque, the steering input is transmitted from the steering wheel through the augmented chain and sprocket assembly, the coupler shaft, the steering shaft, the rack and pinion gear set, the draglink, and the tie rod to a pair of front wheels thereby causing the pair of front wheels to turn.

9. The steering system of claim 8, wherein the augmented chain and sprocket assembly housing has an oval-like shape of a stadium with two rounded ends, a first rounded end of the two rounded ends being larger than a second rounded end of the two rounded ends;

wherein the combination of the large sprocket, the small sprocket, the input shaft and the output shaft acts as a single unit and is rotationally affixed to the inside of the augmented chain and sprocket assembly housing, the large sprocket and input shaft unit is located at the first rounded end of the augmented chain and sprocket assembly housing while the small sprocket and output shaft unit is located at the second rounded end of the augmented chain and sprocket assembly housing such that the teeth on the large sprocket do not contact those on the small sprocket, the chain is positioned around the large sprocket and the small sprockets such that the links on the chain are able to contact the teeth on the large sprocket and the small sprocket, the contact between the links on the chain and the teeth on the large sprocket and the small sprocket depicts a rotational interaction between the chain and large sprocket and small sprocket, the rotational interaction is caused by the rotational torque from the steering input and thereby enables steering input to be transmitted internally from the large sprocket and input shaft unit to the small sprocket and output shaft unit;

wherein the electric motor is attached to the inside of the augmented chain and sprocket assembly housing in a manner such that the rotor of the electric motor is oriented adjacent to and perpendicular to an orientation of the output shaft of the augmented chain and sprocket assembly, the adjacent perpendicular orientation enables the teeth on the cup-shaped gear to mesh with the serrations on the output shaft, the meshing between the teeth and serrations defines a rotational interaction between the electric motor and output shaft, the electric motor generates a torque force such that the rotational interaction between the electric motor and output shaft enables the torque force to be exerted on the output shaft, the torque force multiplies the rotational torque from the steering input thereby facilitating the rotation of the output shaft.

10. The steering system of claim 9, wherein the rack and pinion gearset is a manual rack and pinion gearset; wherein secured to a firewall is the augmented chain and sprocket assembly, the augmented chain and sprocket assembly is vertically oriented such that the first rounded end is at a top while the second rounded end is at a bottom, the input shaft of the augmented chain and sprocket assembly is directed backward towards the steering wheel and is pivotally connected to an end of a steering column while the output shaft of the augmented chain and sprocket assembly is directed forward towards the front axle and is pivotally connected to the back end of the coupler shaft, the front end of the coupler shaft is pivotally connected to an input shaft of an electric assist motor box while an output shaft of the electric assist motor box is pivotally connected to the back end of the steering shaft, and the front end of the steering shaft is pivotally connected to a pinion shaft of the manual rack and pinion gearset;

wherein cooperation among the augmented chain and sprocket assembly, coupler shaft, electric assist motor box, and steering shaft enables steering input to be transmitted from the steering column to the manual rack and pinion gearset;

wherein the manual rack and pinion gearset is attached to the front axle between a differential housing and a driver side inner-C end forging, a rack of the manual rack and pinion gearset is pivotally connected to the first end of the draglink while the second end of the draglink is pivotally connected to the passenger-side steering knuckle, the passenger-side steering knuckle is pivotally connected to the first end of the tie rod while the second end of the tie rod is pivotally connected to the driver-side steering knuckle;

wherein cooperation among the manual rack and pinion gearset, draglink, and tie rod enables steering input to be transmitted from the manual rack and pinion gearset to the driver-side and passenger-side steering knuckles, transmission of steering input to the driver-side and passenger-side steering knuckles enables the driver-side and passenger-side steering knuckles to turn, and thereby turn the vehicle.

11. The steering system of claim 9, wherein the rack and pinion gearset is a ram assist rack and pinion gearset;

wherein secured to a firewall is the augmented chain and sprocket assembly, the assembly is vertically oriented such that the first rounded end is at the top while the second rounded end is at the bottom, the input shaft of the augmented chain and sprocket assembly is directed backward towards the steering wheel and is pivotally connected to an end of a steering column that is opposite the steering wheel, while the output shaft of the augmented chain and sprocket assembly is directed forward towards the front axle and is pivotally connected to the back end of the coupler shaft, the front end of the coupler shaft is pivotally connected to an input shaft of a control valve while an output shaft of the control valve is pivotally connected to the back end of the steering shaft, and the front end of the steering shaft is pivotally connected to a pinion shaft of the ram assist rack and pinion gearset;

wherein cooperation among the augmented chain and sprocket assembly, coupler shaft, control valve, and steering shaft enables steering input to be transmitted from the steering column to the ram assist rack and pinion gearset;

wherein the ram assist rack and pinion gearset is attached to the front axle between a differential housing and a driver side inner-C end forging;

wherein a first end and a second end of a ram of the ram assist rack and pinion gearset are connected to a driver-side end and a passenger-side end of a rack of the ram assist rack and pinion gearset, and to a first end and a second end of a tie rod bar of the ram assist rack and pinion gearset, the mid-point of the tie rod bar is pivotally connected to the first end of the draglink while the second end of the draglink is pivotally connected to the passenger-side steering knuckle, the passenger-side steering knuckle is pivotally connected to the first end of the tie rod while the second end of the tie rod is pivotally connected to the driver-side steering knuckle;

wherein cooperation among the ram assist rack and pinion gearset, draglink, and tie rod enables steering input to be transmitted from the ram assist rack and pinion gearset to the driver-side and passenger-side steering knuckles, transmission of steering input to the driver-side and passenger-side steering knuckles enables the driver-side and passenger-side steering knuckles to turn, and thereby turn the vehicle.

12. The steering system of claim 8, wherein the augmented chain and sprocket assembly housing has an oval-like shape of a stadium with two rounded ends, a first rounded end of the two rounded ends being larger than a second rounded end of the two rounded ends;

wherein the combination of the large sprocket, the small sprocket, the input shaft and the output shaft acts as a single unit and is rotationally affixed to the inside of the augmented chain and sprocket assembly housing, the large sprocket and input shaft unit is located at the first rounded end of the augmented chain and sprocket assembly housing while the small sprocket and output shaft unit is located at the second rounded end of the augmented chain and sprocket assembly housing such that the teeth on the large sprocket do not contact those on the small sprocket, the chain is positioned around the large sprocket and the small sprocket such that the links on the chain are able to contact the teeth on the large sprocket and the small sprocket, the contact between the links on the chain and the teeth on the large sprocket and the small sprocket depicts a rotational interaction between the chain and large sprocket and small sprocket, the rotational interaction is caused by the rotational torque from the steering input and thereby enables steering input to be transmitted internally from the large sprocket and input shaft unit to the small sprocket and output shaft unit;

wherein the electric motor is attached to the inside of the augmented chain and sprocket assembly housing in a manner such that the rotor of the electric motor is oriented adjacent to and perpendicular to an orientation of the input shaft of the augmented chain and sprocket assembly, the adjacent perpendicular orientation enables the teeth on the cup-shaped gear to mesh with the serrations on the input shaft, the meshing between the teeth and serrations defines a rotational interaction between the electric motor and input shaft, the electric motor generates a torque force such that the rotational interaction between the electric motor and input shaft enables the torque force to be exerted on the input shaft, the torque force multiplies the rotational torque from the steering input thereby facilitating the rotation of the output shaft.

13. The steering system of claim 12, wherein the rack and pinion gearset is a manual rack and pinion gearset; wherein secured to a firewall is the augmented chain and sprocket assembly, the augmented chain and sprocket assembly is vertically oriented such that the first rounded end is at a top while the second rounded end is at a bottom, the input shaft of the augmented chain and sprocket assembly is directed backward towards the steering wheel and is pivotally connected to an end of a steering column while the output shaft of the augmented chain and sprocket assembly is directed forward towards the front axle and is pivotally connected to the back end of the coupler shaft, the front end of the coupler shaft is pivotally connected to an input shaft of an electric assist motor box while an output shaft of the electric assist motor box is pivotally connected to the back end of the steering shaft, and the front end of the steering shaft is pivotally connected to a pinion shaft of the manual rack and pinion gearset;

wherein cooperation among the augmented chain and sprocket assembly, coupler shaft, electric assist motor box, and steering shaft enables steering input to be transmitted from the steering column to the manual rack and pinion gearset;

wherein the manual rack and pinion gearset is attached to the front axle between a differential housing and a driver side inner-C end forging, a rack of the manual rack and pinion gearset is pivotally connected to the first end of the draglink while the second end of the draglink is pivotally connected to the passenger-side steering knuckle, the passenger-side steering knuckle is pivotally connected to the first end of the tie rod while the second end of the tie rod is pivotally connected to the driver-side steering knuckle;

wherein cooperation among the manual rack and pinion gearset, draglink, and tie rod enables steering input to be transmitted from the manual rack and pinion gearset to the driver-side and passenger-side steering knuckles, transmission of steering input to the driver-side and passenger-side steering knuckles enables the driver-side and passenger-side steering knuckles to turn, and thereby turn the vehicle.

14. The steering system of claim 12, wherein the rack and pinion gearset is a ram assist rack and pinion gearset;

wherein secured to a firewall is the augmented chain and sprocket assembly, the assembly is vertically oriented such that the first rounded end is at the top while the second rounded end is at the bottom, the input shaft of the augmented chain and sprocket assembly is directed backward towards the steering wheel and is pivotally connected to an end of a steering column that is opposite of the steering wheel, while the output shaft of the augmented chain and sprocket assembly is directed forward towards the front axle and is pivotally connected to the back end of the coupler shaft, the front end of the coupler shaft is pivotally connected to an input shaft of a control valve while an output shaft of the control valve is pivotally connected to the back end of the steering shaft, and the front end of the steering shaft is pivotally connected to a pinion shaft of the ram assist rack and pinion gearset;

wherein cooperation among the augmented chain and sprocket assembly, coupler shaft, control valve, and steering shaft enables steering input to be transmitted from the steering column to the ram assist rack and pinion gearset;

wherein the ram assist rack and pinion gearset is attached to the front axle between a differential housing and a driver side inner-C end forging;

wherein a first end and a second end of a ram of the ram assist rack and pinion gearset are connected to a driver-side end and a passenger-side end of a rack of the ram assist rack and pinion gearset, and to a first end and a second end of a tie rod bar of the ram assist rack and pinion gearset, the mid-point of the tie rod bar is pivotally connected to the first end of the draglink while the second end of the draglink is pivotally connected to the passenger-side steering knuckle, the passenger-side steering knuckle is pivotally connected to the first end of the tie rod while the second end of the tie rod is pivotally connected to the driver-side steering knuckle;

wherein cooperation among the ram assist rack and pinion gearset, draglink, and tie rod enables steering input to be transmitted from the ram assist rack and pinion gearset to the driver-side and passenger-side steering knuckles, transmission of steering input to the driver-side and passenger-side steering knuckles enables the driver-side and passenger-side steering knuckles to turn, and thereby turn the vehicle.

15. A steering system for a vehicle having a frame with respective frame sides and suspended above solid front and rear axles, the steering system comprising:
   a rack and pinion gearset configured with a slow steering ratio;
   an augmented chain and sprocket assembly comprising an input shaft and an output shaft with a quick steering ratio of at least 1.5 to 1; and
   wherein a turning of a steering wheel by a driver defines a steering input, the steering input refers to a rotational torque, the steering input is transmitted from the steering wheel through the augmented chain and sprocket assembly and the rack and pinion gearset to a pair of front wheels thereby causing the pair of front wheels to turn;
wherein the augmented chain and sprocket assembly further comprises:
   an augmented chain and sprocket assembly housing;
   a large sprocket having teeth and housed within the augmented chain and sprocket housing;
   a small sprocket having teeth and housed within the augmented chain and sprocket housing;
   a chain having chain links rotationally coupling the large sprocket and small sprocket, wherein the chain is housed within the augmented chain and sprocket housing;
   an electric motor having a rotor and a cup-shaped gear with teeth and housed within the augmented chain and sprocket housing; and
wherein the input shaft is adapted to the large sprocket and output shaft is adapted to the small sprocket, the input shaft and the output shaft protrude through opposite sides of the augmented chain and sprocket housing.

16. The steering system of claim 15, wherein the electric motor is rotationally coupled to the output shaft and defines a rotational interaction between the electric motor and the output shaft, the electric motor generates a torque force such that the rotational interaction between the electric motor and output shaft enables the torque force to be exerted on the output shaft, the torque force multiplies the rotational torque from the steering input thereby facilitating the rotation of the output shaft.

17. The steering system of claim 16, the steering system further comprising:
   a coupler shaft having a front and back ends, wherein the front end of the coupler shaft is connected to an electric assist motor box, and said back end is connected to the augmented chain and sprocket assembly housing;
   a steering shaft having a front and back ends,
      wherein the back end of the steering shaft is connected to an output shaft of the electric motor assist box, and the front end of the steering shaft is connected to the rack and pinion gearset;
   a draglink having a first and second end, the second end connected to a passenger-side steering knuckle; a tie rod having a first and second end, the first end is pivotally connected to the passenger-side steering knuckle while the second end is pivotally connected to a driver-side steering knuckle.

18. The steering system of claim 17, wherein the rack and pinion gearset is a manual rack and pinion gearset;
   wherein secured to a firewall is the augmented chain and sprocket assembly, the augmented chain and sprocket assembly is vertically oriented in between two rounded ends such that the first rounded end of the two rounded ends is at a top while the second rounded end of the two rounded ends is at a bottom, the input shaft of the augmented chain and sprocket assembly is directed backward towards the steering wheel and is pivotally connected to an end of a steering column while the output shaft of the augmented chain and sprocket assembly is directed forward towards the front axle and is pivotally connected to the back end of the coupler shaft, the front end of the coupler shaft is pivotally connected to an input shaft of an electric assist motor box while an output shaft of the electric assist motor box is pivotally connected to the back end of the steering shaft, and the front end of the steering shaft is pivotally connected to a pinion shaft of the manual rack and pinion gearset;
   wherein cooperation among the augmented chain and sprocket assembly, coupler shaft, electric assist motor box, and steering shaft enables steering input to be transmitted from the steering column to the manual rack and pinion gearset;
   wherein the manual rack and pinion gearset is attached to the front axle between a differential housing and a driver side inner-C end forging, a rack of the manual rack and pinion gearset is pivotally connected to the first end of the draglink while the second end of the draglink is pivotally connected to the passenger-side steering knuckle, the passenger-side steering knuckle is pivotally connected to the first end of the tie rod while the second end of the tie rod is pivotally connected to the driver-side steering knuckle;
   wherein cooperation among the manual rack and pinion gearset, draglink, and tie rod enables steering input to be transmitted from the manual rack and pinion gearset to the driver-side and passenger-side steering knuckles, transmission of steering input to the driver-side and passenger-side steering knuckles enables the driver-side and passenger-side steering knuckles to turn, and thereby turn the vehicle.

19. The steering system of claim 17, wherein the rack and pinion gearset is a ram assist rack and pinion gearset;
   wherein secured to a firewall is the augmented chain and sprocket assembly, the assembly is vertically oriented in between two rounded ends, the first rounded end of the two rounded ends is at the top while the second rounded end of the two rounded ends is at the bottom, the input shaft of the augmented chain and sprocket assembly is directed backward towards the steering wheel and is pivotally connected to an end of a steering column that is opposite the steering wheel, while the output shaft of the augmented chain and sprocket assembly is directed forward towards the front axle and is pivotally connected to the back end of the coupler shaft, the front end of the coupler shaft is pivotally connected to an input shaft of a control valve while an output shaft of the control valve is pivotally connected to the back end of the steering shaft, and the front end of the steering shaft is pivotally connected to a pinion shaft of the ram assist rack and pinion gearset;
   wherein cooperation among the augmented chain and sprocket assembly, coupler shaft, control valve, and steering shaft enables steering input to be transmitted from the steering column to the ram assist rack and pinion gearset;

wherein the ram assist rack and pinion gearset is attached to the front axle between a differential housing and a driver side inner-C end forging;

wherein a first end and a second end of a ram of the ram assist rack and pinion gearset are connected to a driver-side end and a passenger-side end of a rack of the ram assist rack and pinion gearset, and to a first end and a second end of a tie rod bar of the ram assist rack and pinion gearset, the mid-point of the tie rod bar is pivotally connected to the first end of the draglink while the second end of the draglink is pivotally connected to the passenger-side steering knuckle, the passenger-side steering knuckle is pivotally connected to the first end of the tie rod while the second end of the tie rod is pivotally connected to the driver-side steering knuckle;

wherein cooperation among the ram assist rack and pinion gearset, draglink, and tie rod enables steering input to be transmitted from the ram assist rack and pinion gearset to the driver-side and passenger-side steering knuckles, transmission of steering input to the driver-side and passenger-side steering knuckles enables the driver-side and passenger-side steering knuckles to turn, and thereby turn the vehicle.

\* \* \* \* \*